(12) United States Patent
Amirsolaimani et al.

(10) Patent No.: US 11,668,929 B2
(45) Date of Patent: Jun. 6, 2023

(54) ACHROMATIC OPTICAL LENS ASSEMBLY HAVING PANCHARATNAM BERRY PHASE LENS

(71) Applicant: Meta Platforms Technologies, LLC, Menlo Park, CA (US)

(72) Inventors: Babak Amirsolaimani, Redmond, WA (US); Brian Wheelwright, Sammamish, WA (US); Yusufu Njoni Bamaxam Sulai, Snohomish, WA (US); Weichuan Gao, Redmond, WA (US); Fenglin Peng, Redmond, WA (US); Ying Geng, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 379 days.

(21) Appl. No.: 16/854,851

(22) Filed: Apr. 21, 2020

(65) Prior Publication Data

US 2020/0341268 A1  Oct. 29, 2020

Related U.S. Application Data

(60) Provisional application No. 62/840,164, filed on Apr. 29, 2019.

(51) Int. Cl.
| | | |
|---|---|---|
| G02B 27/01 | (2006.01) | |
| G02B 9/10 | (2006.01) | |
| G02B 27/00 | (2006.01) | |
| G02B 5/30 | (2006.01) | |
| G02B 27/09 | (2006.01) | |
| G02B 5/08 | (2006.01) | |

(52) U.S. Cl.
CPC .......... *G02B 27/0025* (2013.01); *G02B 5/08* (2013.01); *G02B 5/3025* (2013.01); *G02B 5/3083* (2013.01); *G02B 27/0983* (2013.01)

(58) Field of Classification Search
CPC ........ G02B 27/0101; G02B 2027/0116; G02B 27/0068; G02B 27/0172; G02B 9/10; G02B 27/06
See application file for complete search history.

(56) References Cited

U.S. PATENT DOCUMENTS

| | | |
|---|---|---|
| 10,133,168 B1 | 11/2018 | Taylor et al. |
| 2018/0101020 A1 | 4/2018 | Gollier et al. |
| 2018/0284464 A1 | 10/2018 | Lu et al. |

OTHER PUBLICATIONS

International Search Report and Written Opinion dated Aug. 3, 2020, in PCT Application No. PCT/US2020/030244, filed on Apr. 28, 2020 (10 pages).
A. Jamali et al., "A thin film liquid crystal based compensator for the chromaticaberration of optical lenses," published in Molecular Crystals and Liquid Crystals, 657(1):46-50, Nov. 2017, also available online at URL: https://www.researchgate.net/publication/322590902_A_thin_film_liquid_crystal_based_compensator_for_the_chromatic_aberration_of_optical_lenses, retrieved on Apr. 21, 2020 (10 pages).

*Primary Examiner* — Ryan D Howard
(74) *Attorney, Agent, or Firm* — Millburn IP PLLC

(57) ABSTRACT

An optical lens assembly includes an optical lens and a Pancharatnam Berry Phase ("PBP") element coupled to the optical lens. The PBP element is configured to provide chromatic aberration correction for the optical lens. An Abbe number of the PBP element and an Abbe number of the optical lens have opposite signs.

20 Claims, 14 Drawing Sheets

ACHROMATIC OPTICAL LENS ASSEMBLY HAVING PANCHARATNAM BERRY PHASE LENS

CROSS REFERENCE TO RELATED APPLICATION

This application claims the benefit of U.S. Provisional Application No. 62/840,164, filed on Apr. 29, 2019, which is incorporated by reference in its entirety.

TECHNICAL FIELD

The present disclosure generally relates to optical devices and, more specifically, to an achromatic optical lens assembly having a Pancharatnam Berry Phase ("PBP") lens.

BACKGROUND

Optical devices configured to realize virtual reality ("VR"), augmented reality ("AR"), and/or mixed reality ("MR") have been widely used in a large variety of applications, such as aviation, engineering, science, medicine, computer gaming, video, sports, training, simulations, etc. It is often desirable to make such optical devices compact and light weight, and having a high resolution, a large field of view ("FOV"), and a small form factor. Such optical devices generally include a display element configured to generate an image light propagating through a lens system to reach eyes of a user. The lens system typically includes multiple optical elements, such as one or more of a lens, a waveplate, a reflector, etc., for focusing the image light to the eyes.

SUMMARY

One aspect of the present disclosure provides an optical lens assembly. The optical lens assembly includes an optical lens and a Pancharatnam Berry Phase ("PBP") element coupled to the optical lens. The PBP element is configured to provide chromatic aberration correction for the optical lens. An Abbe number of the PBP element and an Abbe number of the optical lens have opposite signs.

Another aspect of the present disclosure provides an optical system. The optical system includes an electronic display configured to generate an image light. The optical system also includes an optical lens assembly optically coupled with the electronic display and configured to guide the image light to an eye-box. The optical lens assembly includes an optical lens and a Pancharatnam Berry Phase ("PBP") element coupled to the optical lens, and configured to provide chromatic aberration correction for the optical lens. An Abbe number of the PBP element and an Abbe number of the optical lens have opposite signs.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1:
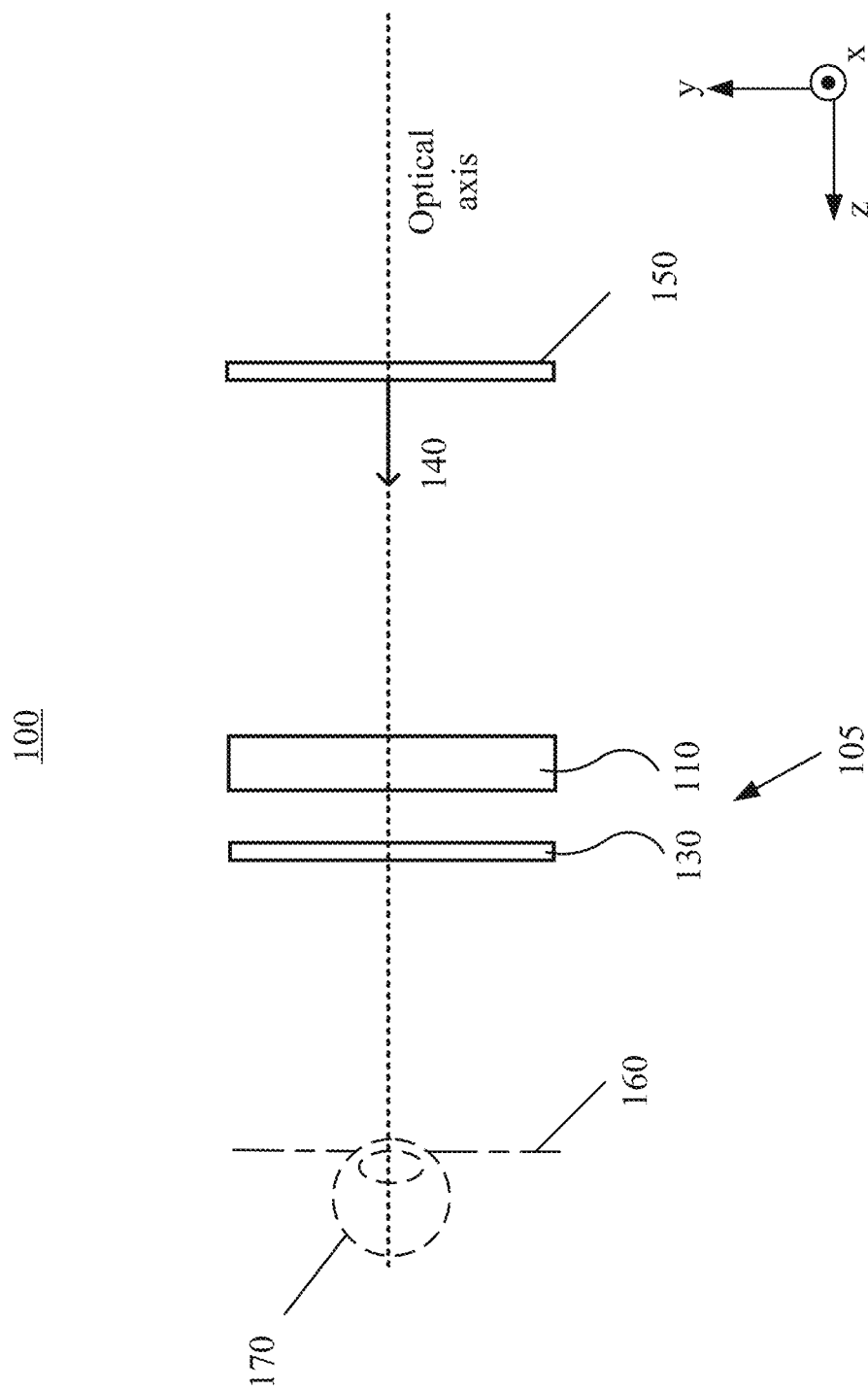
FIG. 1 illustrates a schematic diagram of a pancake lens assembly, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

The term "optical device" as used herein should be broadly interpreted to encompass all types of optical element, optical film, optical coating, optical layer, optical apparatus, optical system, optical assembly, etc.

Optical devices, such as near-eye displays ("NEDs") configured to realize VR, AR and/or MR have been widely used in a large variety of applications, such as aviation, engineering, science, medicine, computer gaming, video, sports, training, etc. To achieve a compact size and a light weight while maintaining good optical characteristics, an NED often includes a pancake lens in the lens system to fold the optical path, thereby reducing the back focal distance in the NED. However, a focus of the pancake lens may be strongly chromatic, i.e., a light output from the lens system may feature chromatic aberration, which may reduce image quality in an imaging device that employs the pancake lens and a light source that emits lights of multiple wavelengths or color channels. In addition, a pancake lens usually includes more reflectors or partial reflectors than a conventional lens. Various issues, such as ghost images, may arise in a lens system having a pancake lens.

The present disclosure provides an optical lens assembly that has an achromatic property over a predetermined spectrum (or wavelength range), e.g., a visible spectrum. The optical lens assembly may include an optical lens and a Pancharatnam Berry Phase ("PBP") element optically coupled to the optical lens. The PBP element may be configured to provide chromatic aberration correction for the optical lens. The optical lens may be any suitable lens exhibiting certain amount of chromatic aberration. In the following discussion, a pancake lens is used as an example. The PBP element may have an Abbe number with a sign opposite to that of an Abbe number of the optical lens. In some embodiments, the optical lens may be a pancake lens or any other suitable lens that may exhibit chromatic aberration. In the following discussions, the pancake lens is used as an example of the optical lens. The pancake lens may include a first optical element having a first surface configured to receive a light and an opposing second surface configured to output the light with at least one property of the light altered. The pancake lens may also include a second optical element coupled to the first optical element to further alter one or more properties of the light received from the first optical element. At least one of a first surface or an opposing second surface of the second optical element may be configured to reflect the light having a first polarization received from the first optical element back to the first optical element, and transmit the light having a second polarization received from the first optical element. The second polarization may be different from (e.g., orthogonal to or opposite to) the first polarization. In some embodiments, the PBP element may be disposed between the first optical element and the second optical element of the pancake lens. In some embodiments, the second optical element may be disposed between the PBP element and the first optical element.

In some embodiments, the present disclosure provides an optical system including the above-mentioned optical lens assembly. The optical system may be, for example, an NED for VR, AR, and/or MR applications. The optical system may include an electronic display configured to generate an image light. The optical system may also include an optical lens assembly optically coupled with the electronic display and configured to guide the image light to an eye-box. The optical lens assembly may be any of the embodiments disclosed herein.

FIG. 1 illustrates a schematic diagram of an optical system 100 according to an embodiment of the disclosure. As shown in FIG. 1, the optical system 100 may include an optical lens assembly 105. The optical lens assembly 105 may include a pancake lens 110 and a Pancharatnam Berry Phase ("PBP") element 130 optically coupled to the pancake lens 110. The optical system 100 may include an electronic display 150. The electronic display 150 may be configured to emit a light 140 toward the pancake lens 110. In some embodiments, the disclosed pancake lens 110 may be a monolithic optical element (e.g., lens). The pancake lens assembly 105 may be configured to guide the light 140 from the electronic display 150 to an eye-box located at an exit pupil 160 and further to an eye 170 of a user of the optical system 100. Hereinafter, the light emitted by the electronic display 150 for forming an image at the eye 170 may also referred to as "image light." In some embodiments, the electronic display 150 may be a monochromatic display that includes a narrowband monochromatic light source (e.g., a 30-nm-bandwidth light source). In some embodiments, the electronic display 150 may be a polychromatic display (e.g., a red-green-blue ("RGB") display) that includes a broadband polychromatic light source (e.g., 300-nm-bandwidth light source covering the visible wavelength range). In some embodiments, the electronic display 150 may be a polychromatic display (e.g., an RGB display) created by stacking a plurality of monochromatic displays, which may include corresponding narrowband monochromatic light sources respectively.

In the pancake lens, dispersion may occur as the image light propagates through the pancake lens. The dispersion may cause chromatic aberration. Although optical elements with different amounts of dispersion have been used to correct the chromatic aberration of glass lenses by forming an achromatic doublet in conventional technologies, such an approach often suffers from issues such as a high cost and difficulty in fabricating optical elements with a large aperture size.

In the technical solutions provided by the present disclosure, a PBP element is used to correct chromatic aberration for the optical lens, such as a pancake lens. In some embodiments, the PBP element 130 may be a thin film including liquid crystals ("LCs"). The optic axes of the LCs may be manipulated to realize a specific optical function. The PBP element 130 may be configured with an Abbe number having a sign that is opposite to that of an Abbe number of the pancake lens 110, thereby providing chromatic aberration correction for the pancake lens 110. In some embodiments, the PBP element 130 may be a lens (hence the PBP element 130 may be referred to as a PBP lens 130). With the PBP element configured to correct chromatic aberration for the pancake lens, the optical system may be made compact and light weight. Processes and cost associated with fabrication of the optical system may be reduced.

In optics and lens design, the Abbe number, also known as the V-number or the constringence of a transparent material, is a measure of the dispersion of the material (e.g., variation of the refractive index versus wavelength. A higher value of the V-number indicates a lower dispersion and a lower value of the V-number indicates a higher dispersion. The Abbe number $V_D$ of a material may be defined as:

$$V_D = \frac{n_{D-1}}{n_F - n_C}, \quad (1)$$

where $n_D$, $n_F$ and $n_C$ represent the refractive indices of the material at the wavelengths of the Fraunhofer D-, F-, and C-spectral lines (corresponding to 589.3 nm, 486.1 nm, and 656.3 nm respectively). In some embodiments, the PBP lens 130 may have a negative Abbe number, and the pancake lens 110 may have a positive Abbe number. In some embodiments, the Abbe number of the PBP lens 130 may be one order of magnitude lower than the Abbe number of the material of a monolithic optical element (e.g., the pancake lens 110). For example, a typical diffractive optical element has the Abbe number of about −3, and the material "Schott BK7" manufactured by the company SCHOTT has the Abbe number of about 64.2. Thus, the PBP lens 130 may be configured with a small optical power to correct the chromatic aberration caused by the pancake lens 110 that has a large optical power relative to the PBP lens, which may simplify the fabrication process and reduce the fabrication cost of the PBP lens 130.

Further, PBP lenses have been shown to have a high optical efficiency and a well-defined parabolic phase profile. The thickness of the PBP lenses may be primarily determined by the thickness of the substrate as the LC layer disposed on the substrate is much thinner (e.g., about 2 µm). Thus, PBP lenses based on LC layers may be made compact. In some embodiments, the PBP lens 130 may have a flat or curved structure with a small volume. Compared to an achromatic doublet including multiple lenses, the PBP lens 130 that is a diffractive lens may have a reduced form factor. Thus, using the PBP lens 130 to correct the chromatic aberration of the pancake lens 110 may reduce the form factor of the optical system 100. In some embodiments, the PBP lens 130 may have one or more flat surfaces. In some embodiments, the PBP lens 130 may be curved in at least one dimension. For example, the PBP lens 130 may have one or more surfaces that are curved in one dimension (e.g., a cylindrical surface), or the PBP lens 130 may have one or more surfaces that are curved in two dimensions (e.g., spherical, aspherical, freeform, etc.).

In some embodiments, the substrate of the PBP lens 130 may be disposed at an optical surface of a separate optical element (e.g., the pancake lens 110), such that the PBP lens 130 may be directly coupled to the separate optical element. For example, the substrate of the PBP lens 130 may be disposed at a surface of another optical element of the pancake lens 110. In some embodiments, the substrate of the PBP lens 130 may be a part of another optical element or device, or a part of another opto-electrical element or device. For example, the substrate of the PBP lens 130 may be a solid optical lens or a part of a solid optical lens. In some embodiments, the substrate of the PBP lens 130 may be a part of a functional device, such as a display screen. In some embodiments, the substrate of the PBP lens 130 may be used to fabricate, store, or transport the PBP lens 130. In some embodiments, the substrate of the PBP lens 130 may be detachable or removable from the rest of the PBP lens 130 after the rest of the PBP lens 130 is fabricated or transported to another place or device. In such embodiments, the number of separate optical elements in the optical system 100 may be reduced. In some embodiments, the PBP lens 130 may be disposed apart from the pancake lens 110 with a gap.

Figure 2A:
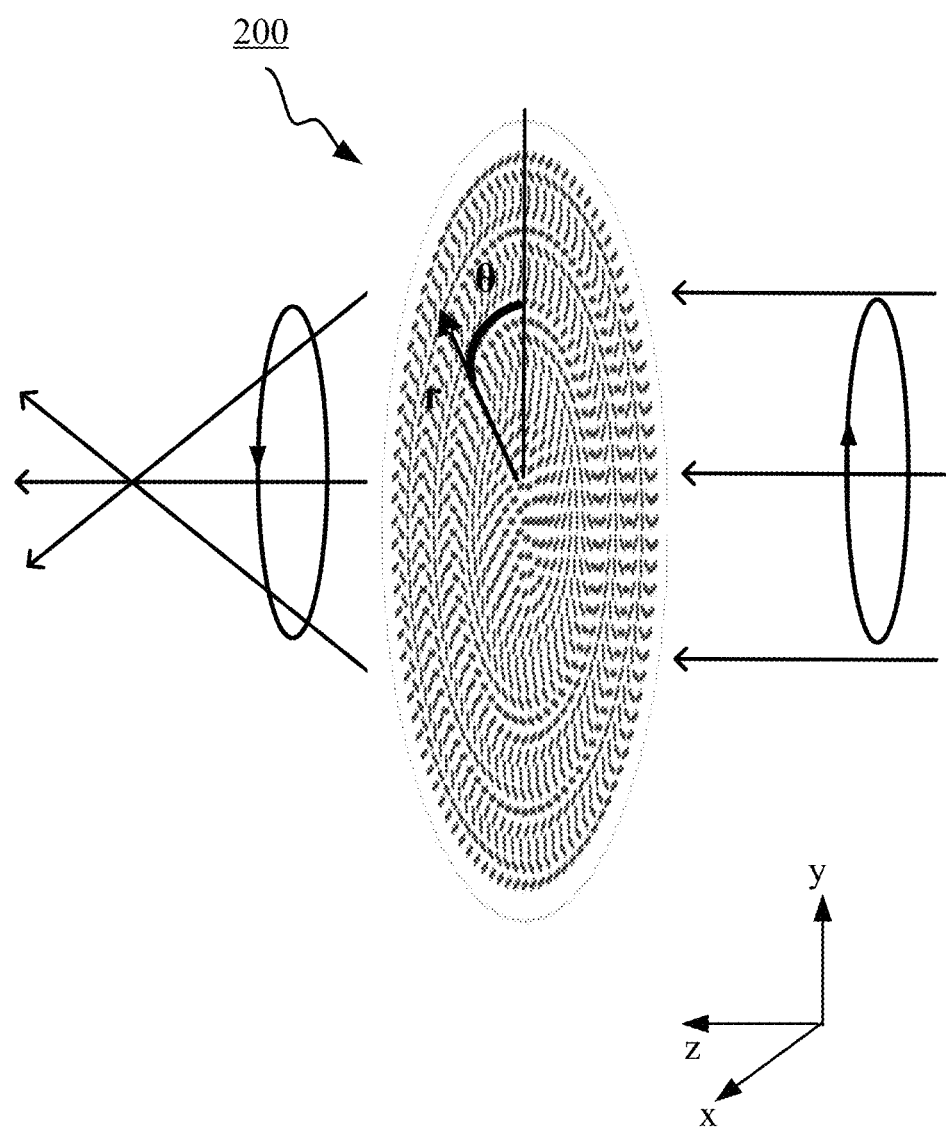
FIGS. 2A-2D illustrate schematic diagrams of a Pancharatnam Berry Phase ("PBP") lens, according to an embodiment of the present disclosure.
Figure 2B:
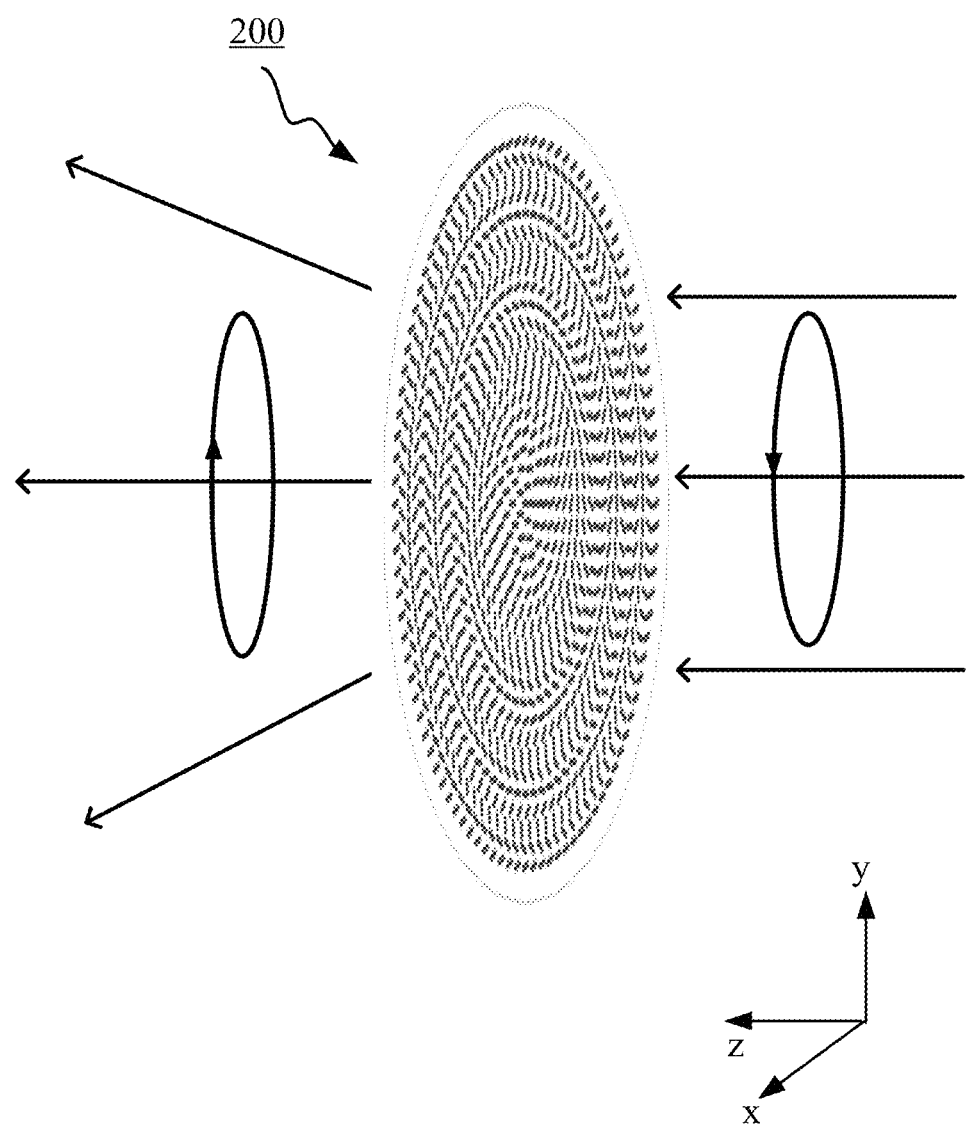

FIGS. 2A and 2B illustrate schematic diagrams of a PBP element 200 (or PBP lens 200) at different optical states, according to an embodiment of the disclosure. The PBP lens 200 may be an embodiment of the PBP lens 130 shown in FIG. 1. The PBP lens 200 may be a diffractive lens sensitive to handedness of a circularly polarized incident light. As shown in FIG. 2A, the PBP lens 200 may include a thin film of liquid crystals ("LCs") (or an LC film), and may create a lens profile via an in-plane orientation (azimuth angle θ) of liquid crystal ("LC") molecules. When the thickness of the LC film corresponds to a half-wave plate (phase difference of π between the ordinary and the extraordinary polarization), the phase difference T between two points across the beam profile may be equal to twice the relative rotation of the optic axis, i.e., T=2θ.

Figure 2C:
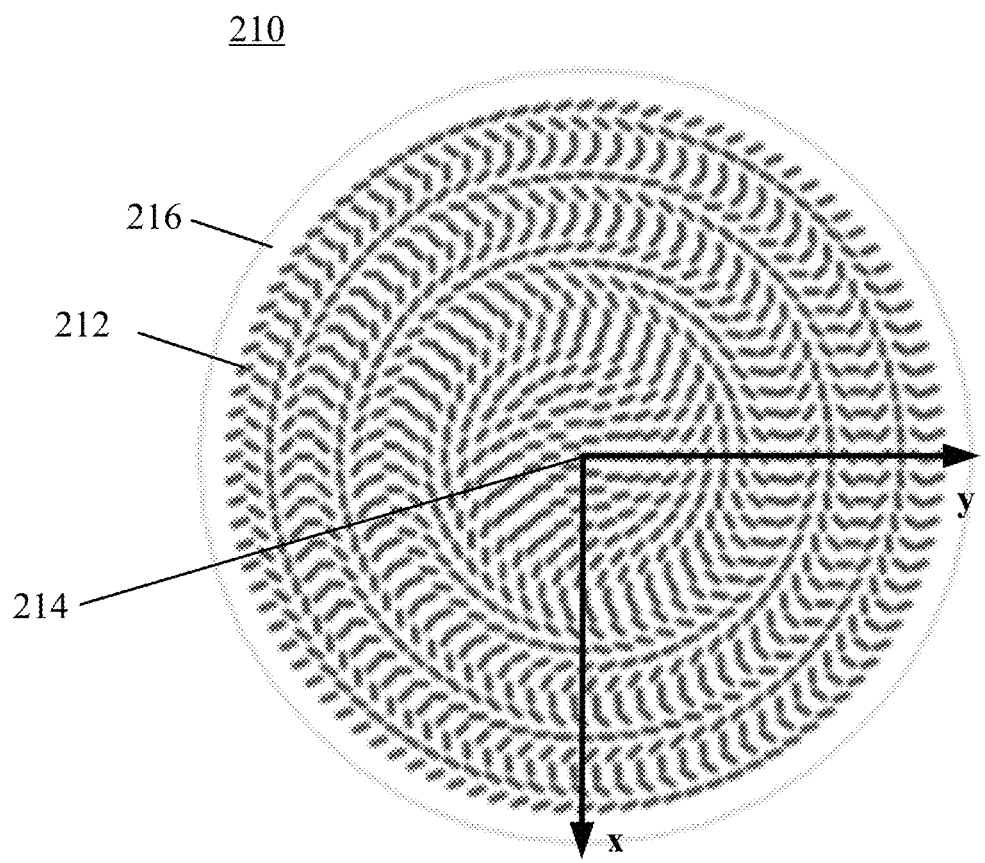

FIG. 2C illustrates LC orientations 210 in the PBP lens 200 shown in FIG. 2A. As shown in FIG. 2C, in the PBP lens 200, an azimuth angle (θ) of an LC molecule 212 may continuously change from a lens center 214 to a lens edge 216 of the PBP lens 200, with a varying pitch Λ. A pitch Λ is defined as a distance for the azimuth angle of LC to be rotated by 180° from an initial state.

Figure 2D:
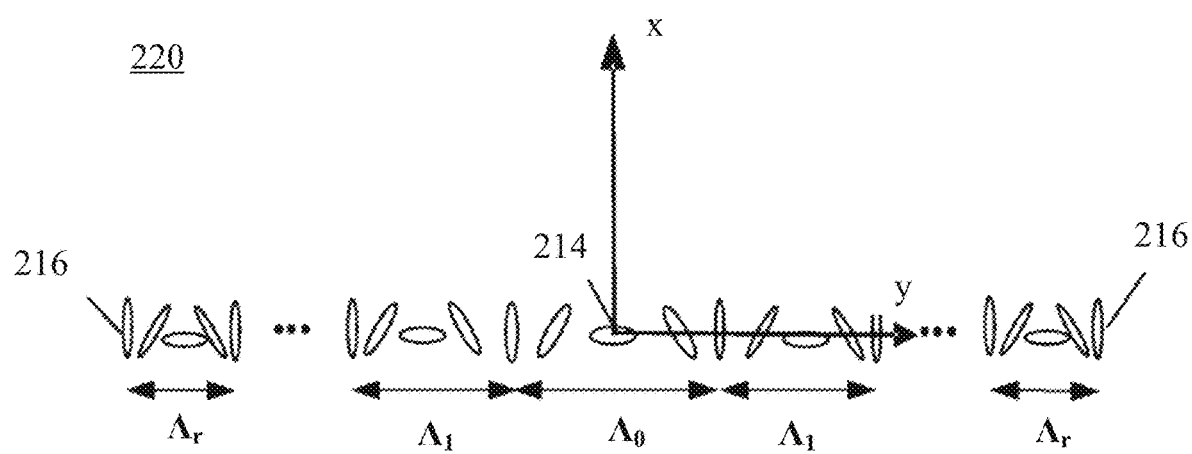

FIG. 2D illustrates a section of LC orientations 220 taken along the y-axis in the PBP lens 200 shown in FIG. 2A. As shown in FIG. 2D, a rate of pitch variation may be a function of distance from the lens center 214. The pitch at the lens center 214 ($\Lambda_0$) may be the largest, and the pitch at the edge 216 ($\Lambda_r$) may be the smallest, i.e., $\Lambda_0 > \Lambda_1 > \ldots > \Lambda_r$. Referring to FIGS. 2A-2D, in the x-y plane, to obtain a PBP lens with lens radius (r) and lens power (+/−f), the azimuth angle θ may satisfy:

$$2\theta = \frac{\pi r^2}{f * \lambda}, \tag{2}$$

where λ is the wavelength of the incident light.

Returning to FIGS. 2A and 2B, the PBP lens 200 may function as an active element or a passive element. An active PBP lens may have three discrete focal states (also referred to as optical states). The three optical states may be a focusing (or converging) state, a neutral state, and a defocusing (or diverging) state. In particular, the active PBP lens in the focusing state may focus (or converge) a circularly polarized incident light (e.g., have a positive focus of 'f'), and the active PBP lens in the defocusing state may defocus (or diverge) a circularly polarized incident light (e.g., have a negative focus of '−f'). When not in the neutral state (e.g., when in the focusing or defocusing state), the active PBP lens may reverse the handedness of a circularly polarized light passing through the active PBP lens in addition to focusing or defocusing the incident light. When in the neutral state, the active PBP lens may not converge or diverge a circularly polarized incident light, and may or may not affect the polarization of the light transmitted through the active PBP lens.

The state of an active PBP lens may be determined by the handedness of the polarization of a circularly polarized incident light, the handedness of a rotation of LC directors in the active PBP lens, and a voltage applied to the PBP lens. In some embodiments, as shown in FIG. 2A, an active PBP lens (e.g., the PBP lens 200) may operate in a focusing state in response to a right-handed circularly polarized ("RHCP") light and a zero applied voltage (or a voltage lower than a predetermined threshold value of the LC film in the active PBP lens). In some embodiments, as shown in FIG. 2A, an active PBP lens (e.g., the PBP lens 200) may operate in a defocusing state in response to a left-handed circularly polarized ("LHCP") light and a zero applied voltage (or a voltage lower than a predetermined threshold value of the LC film in the active PBP lens). Although not shown, in some embodiments, an active PBP lens may operate in a focusing state in response to an LHCP light, and in a defocusing state in response to an RHCP light. In addition to the focusing and defocusing states, an active PBP lens may also operate in a neutral state when the LC molecules are uniformly aligned in an electric field. The active PBP lens in the neutral state may neither focus nor defocus a circularly polarized light, independent of the handedness of a circularly polarized incident light. The handedness of a circularly polarized light passing through the active handedness at the neutral state may be affected or maintained (e.g., not affected), depending on the reorientation of the LC molecules under the electric field.

A passive PBP lens may have two optical states: a focusing state (or converging state) and a defocusing state (or diverging state). The state of a passive PBP lens may be determined by the handedness of a circularly polarized light incident on the passive PBP lens, and the handedness of a rotation of LC directors in the passive PBP lens. In some embodiments, as shown in FIG. 2A, a passive PBP lens (e.g., the PBP lens 200) may operate in a focusing state in response to an RHCP light. In some embodiments, as shown in FIG. 2B, the passive PBP lens (e.g., the PBP lens 200) may operate in a defocusing state in response to an LHCP light. A passive PBP lens may output a circularly polarized light that has a handedness opposite to that of a circularly polarized light input into the passive PBP lens. Although not shown, in some embodiments, a passive PBP lens may operate in a focusing state in response to an LHCP light, and operate in a defocusing state in response to an RHCP light.

Figure 3:
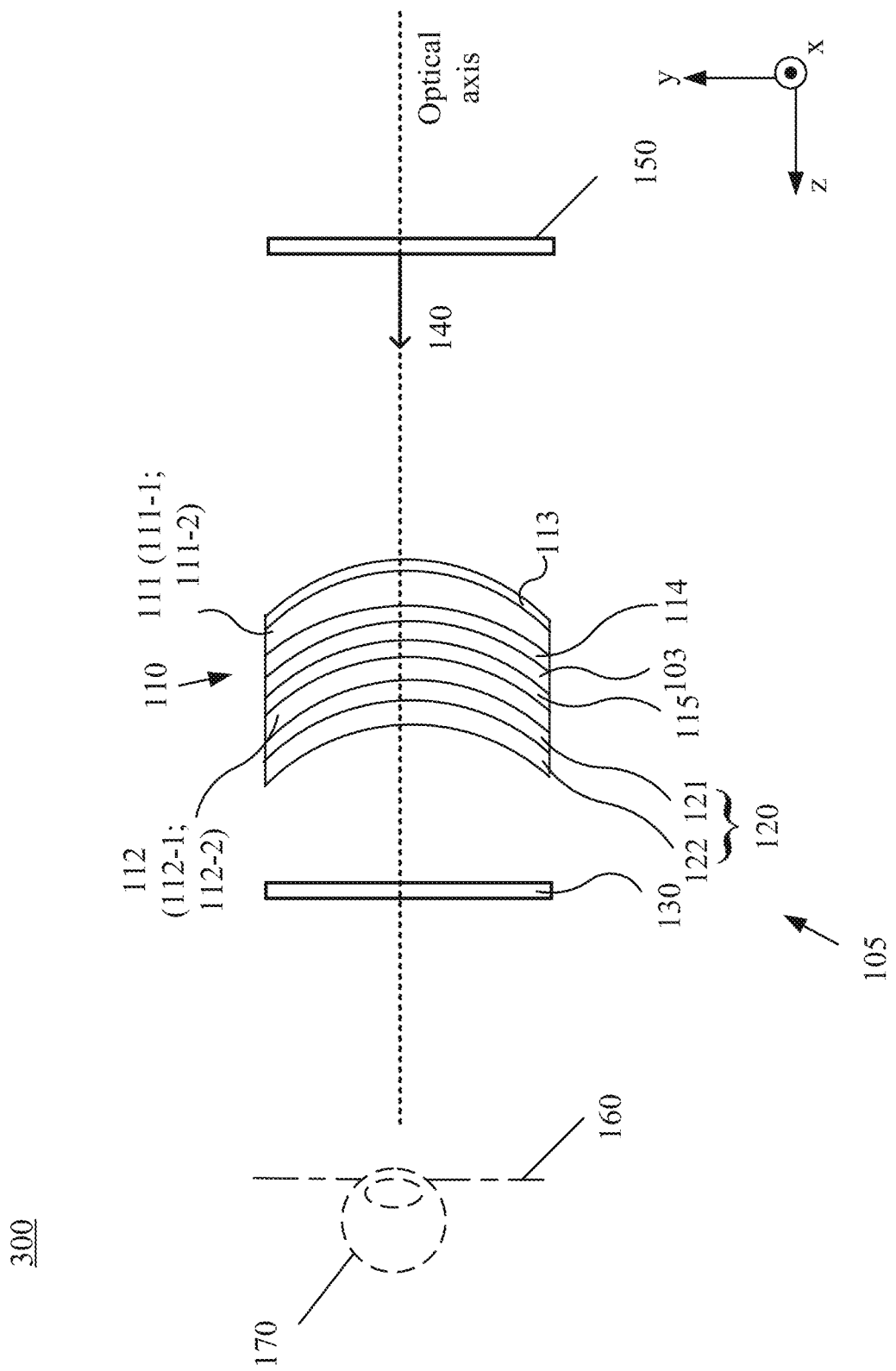
FIG. 3 illustrates a schematic diagram of an optical system, according to an embodiment of the present disclosure.

FIG. 3 illustrates a schematic diagram of an optical system 300 according to an embodiment of the disclosure. The optical system 300 may include elements that are similar to or the same as those included in the optical system 100. In some embodiments, the optical system 300 may be a more detailed embodiment of the optical system 100. As shown in FIG. 3, the optical system 300 may include a pancake lens assembly 105. The pancake lens assembly 105 may include a pancake lens 110 and a PBP element 130.

In some embodiments, the pancake lens 110 may be a monolithic curved optical element. At least one surface of the pancake lens 110 may be a curved surface. The pancake lens 110 may include a first optical element 111 and a second optical element 112 arranged in an optical series. The first optical element 111 may include a first surface 111-1 facing the electronic display 150 and a second surface 111-2 facing the eye 170. The second optical element 112 may include a first surface 112-1 facing the first optical element 111 and a second surface 112-2 facing the eye 170. In some embodiments, the first optical element 111 and the second optical element 112 may be coupled together by an adhesive 103. Each of the first optical element 111 and the second optical element 112 may include one or more optical lenses configured to focus and/or defocus a light.

In some embodiments, the pancake lens 110 may also include a mirror 113 disposed (e.g., deposited, attached, bonded, coated, etc.) at the first surface 111-1 of the first optical element 111 facing the electronic display 150. In some embodiments, the pancake lens 110 may include a waveplate 114 disposed (e.g., deposited, attached, bonded, coated, etc.) at the second surface 111-2 of the first optical element 111 facing the eye 170.

The mirror 113 may be a partial reflector configured to be partially reflective to reflect a portion of the received light. In some embodiments, the mirror 113 may be configured to transmit about 50% of the incident light and reflect about 50% of the incident light. The mirror 113 may be referred to as a 50/50 mirror.

In some embodiments, the waveplate 114 may be a quarter-wave plate ("QWP") configured to alter the polarization of a received light. A quarter-wave plate includes a polarization axis, which may be oriented relative to a linearly polarized incident light to convert the linearly polarized incident light into a circularly polarized light for a visible spectrum and/or infrared spectrum. In some embodiments, the QWP may be configured to convert a circularly polarized light into a linearly polarized light for the visible spectrum and/or the infrared spectrum. In some embodiments, for an achromatic design (e.g., wavelength independent design), the quarter-wave plate may include a multi-layer birefringent material (e.g., polymer or liquid crystals) to produce a quarter-wave birefringence across a wide spectral range (e.g., a wide wavelength range). In some embodiments, for a monochrome design, an angle between the polarization axis (e.g., a fast axis) of the quarter-wave plate and the linearly polarized incident light may be approximately 45 degrees. Although FIG. 3 shows that the mirror 113 and the waveplate 114 are located at different surfaces of the first optical element 111, in some embodiments, the mirror 113 and the waveplate 114 may be located at a same surface (e.g., both being at the first surface 111-1 or at the second surface 111-2) of the first optical element 111.

The pancake lens 110 may include a reflective polarizer 115 disposed (e.g., deposited, attached, bonded, coated, etc.) at the first surface 112-1 of the second optical element 112 facing the first optical element 111. In some embodiment, the reflective polarizer 115 may be disposed (e.g., deposited, attached, bonded, coated, etc.) at the second surface 112-2 of the second optical element 112. The reflective polarizer 115 may be a partially reflective mirror configured to reflect a received light of a first linear polarization and transmit a received light of a second linear polarization that is different from (e.g., orthogonal or opposite to) the first polarization. For example, the reflective polarizer 115 may be configured to reflect a light polarized in a blocking direction (e.g., the x-axis direction), and transmit a light polarized in a perpendicular direction (e.g., the y-axis direction). In the disclosed embodiments, the blocking direction may be referred to as a direction of a blocking axis or a blocking axis direction of the reflective polarizer 115, and the perpendicular direction may be referred to as a direction of a transmission axis or a transmission axis direction of the reflective polarizer 115.

In some embodiments, the pancake lens 110 may further include an anti-narcissus film 120 disposed (e.g., deposited, attached, bonded, coated, etc.) at the second surface 112-2 of the second optical element 112 facing the PBP lens 130. In some embodiments, the anti-narcissus film 120 may be an individual film arranged apart from the second optical element 112, rather than being disposed at a surface of the second optical element 112. In a near-eye display ("NED") including the pancake lens assembly 105, an ambient light incident onto an image detector, for example, eyes of the user, may be scattered by the eyes of the user, then reflected from the display to the eyes. As a result, an image of the eyes may be visible to the user. Such a phenomenon is referred to as the narcissus phenomenon. The anti-narcissus film 120 may be configured to suppress the narcissus phenomenon, such that images of the eyes may not be visible to the user. Although FIG. 3 shows that the reflective polarizer 115 and the anti-narcissus film 120 are located at different surfaces of the second optical element 112, in some embodiments, the reflective polarizer 115 and the anti-narcissus film 120 may be located at a same surface (e.g., both being at the first surface 112-1 or at the second surface 112-2) of the second optical element 112.

In some embodiments, the anti-narcissus film 120 may include a linear polarizer 121 and a quarter-wave plate 122 arranged in an optical series. For example, the linear polarizer 121 may be disposed between the quarter-wave plate 122 and the second optical element 112. The transmission axis of the linear polarizer 121 may be oriented substantially parallel to the transmission axis of the reflective polarizer 115. The polarization axis of the quarter-wave plate 122 may be oriented relative to the transmission axis of the linear polarizer 121 to convert a linearly polarized light into a circularly polarized light or vice versa for a visible spectrum and/or infrared spectrum. The operation principle of the anti-narcissus film 120 and the light propagation path inside the optical system 300 will be explained in detail in FIG. 4.

The pancake lens 110 shown in FIG. 3 is for illustrative purposes. In some embodiments, one or more of first optical element 111, the second optical element 112, the mirror 113, the waveplate 114, the reflective polarizer 115, the linear polarizer 121, and the quarter-wave plate 122 may include one or more curved surfaces. In some embodiments, one of more surfaces of the first optical element 111 and the second optical element 112 may be flat surfaces, and the mirror 113, the waveplate 114, the reflective polarizer 115, the linear polarizer 121, and the quarter-wave plate 122 may include one or more flat surfaces. In addition, the locations of the mirror 113, the waveplate 114, the reflective polarizer 115, the linear polarizer 121, and the quarter-wave plate 122 may be different from those shown in FIG. 3. These elements may be disposed at any other suitable sequences at any other suitable locations. Further, in some embodiments, one or more of these elements may be omitted. In some embodiments, the PBP element 130 may be disposed apart from the pancake lens 110. In some embodiments, the PBP element 130 may be disposed at a surface of the pancake lens 110, e.g., at a surface of the quarter-wave plate 122, or at a surface of the second optical element 112 when the anti-narcissus film 120 is omitted. Although the PBP element 130 is shown as having a flat surface, the PBP element 130 may include one or more curved surfaces. For example, when the PBP element 130 is disposed at a curved surface of the second optical element 120 or a curved surface of the quarter-wave plate 122, the PBP element 130 may include a curved surface.

In some embodiments, the first optical element 111 and the second optical element 112 may form a monolithic curved pancake lens 110. In some embodiments, the pancake lens 110 consistent with the present disclosure may have only one optical lens (e.g., the first optical element 111 and the second optical element 112 forming an integrated optical element), or more than two optical lenses (e.g., having a third optical lens). In some embodiments, the pancake lens 110 may further include other optical elements in addition to the first and second optical elements 111 and 112, such as a linear polarizer, a quarter-wave plate, which is not limited by the present disclosure.

To configure the pancake lens assembly 105 to be achromatic or have a low/reduced chromatic aberration, the PBP lens 130 and the pancake lens 110 may be configured to substantially satisfy the following equation (3):

$$\frac{D_p - D_m}{V_{D \cdot p}} + \frac{D_{PBP}}{V_{D \cdot PBP}} = 0, \qquad (3)$$

where $D_p$, $D_m$, and $D_{PBP}$ are the optical powers of the pancake lens 110, the mirror 113, and the PBP lens 130, respectively. The optical power of the pancake lens 110 may be calculated as $$D_p = \frac{1}{f_p}, \quad (4)$$

where $f_p$ is the focal length of the pancake lens 110. When the pancake lens 110 is a thin lens in air, the optical power of the pancake lens 110 may be calculated by the following equation:

$$D_p = (n_{111} - 1)\left(\frac{1}{R_{111\_1}} - \frac{1}{R_{111\_2}}\right) + (n_{112} - 1)\left(\frac{1}{R_{112\_1}} - \frac{1}{R_{112\_2}}\right), \quad (5)$$

where $n_{111}$ and $n_{112}$ are the refractive indices of the first optical element 111 and the second optical element 112, respectively; $R_{111\_1}$, $R_{111\_2}$, $R_{112\_1}$, and $R_{112\_2}$ are the radii of curvature of the first surface 111-1, the second surface 111-2, the first surface 112-1, and the second surface 112-2, respectively. The optical power of the mirror 113 may be calculated as $$D_m = \frac{1}{f_m} = \frac{2}{r}, \quad (6)$$

where $f_m$ is the focal length of the mirror 113, and r is the radius of curvature of the mirror 113. After $D_p$, $D_m$, $V_{D\text{-}p}$, and $V_{D\text{-}PBP}$ are calculated, the optical power of the PBP lens 130 may be calculated according to the equation (3). $V_{D\text{-}p}$ and $V_{D\text{-}PBP}$ are the Abbe numbers of the pancake lens 110 and the PBP lens 130, respectively, which can be calculated according to the equation (1). The Abbe numbers $V_{D\text{-}p}$ and $V_{D\text{-}PBP}$ that satisfy equation (3) have opposite signs (one being positive, another being negative). For the pancake lens 110, a first ratio can be calculated, which is a ratio between a difference in the optical power of the pancake lens 110 and the mirror 113 and the Abbe number of the pancake lens 110. In other words, the first ratio is a ratio between the optical power of the rest of the pancake lens 110 excluding the mirror 113 and the Abbe number of the pancake lens 110. For the PBP lens 130, a second ratio can be calculated, which is a ratio between the optical power of the PBP lens 130 and the Abbe number of the PBP lens 130. According to the equation (3), a sum of the first ratio and the second ratio may be substantially zero at one or more design wavelengths, such as at least one of a red light design wavelength in the red wavelength range (e.g., from 635 nm to 700 nm), a green light design wavelength in the green wavelength range (e.g., from 520 nm to 560 nm), or a blue light design wavelength in the blue wavelength range (e.g., from 450 nm to 490 nm). In some embodiments, the sum of the first ratio and the second ratio may be substantially zero at each of the red light design wavelength in the red wavelength range (e.g., from 635 nm to 700 nm), the green light design wavelength in the green wavelength range (e.g., from 520 nm to 560 nm), and the blue light design wavelength in the blue wavelength range (e.g., from 450 nm to 490 nm). In some embodiments, the sum of the first ratio and the second ratio may not be substantially zero over an entire spectrum, e.g., an entire visible spectrum. Although equation (3) shows that the sum of the first ratio and the second ratio is 0, it is understood that in some embodiments, the sum may not be exactly 0, and may be substantially 0. The sum may be regarded as substantially 0 when the sum is smaller than a predetermined threshold value (or the absolute value of the sum is smaller than a predetermined value). The predetermined threshold value may be determined based on actual applications. For example, in some embodiments, the predetermined threshold value may be on the order of $10^{-4}$, $10^{-3}$, $10^{-2}$, $10^{-1}$, etc. From equation (3), one can derive:

$$\frac{D_p - D_m}{V_{D\text{-}p}} = -\frac{D_{PBP}}{V_{D\text{-}PBP}}.$$

This equation indicates that the first ratio and the second ratio have substantially the same absolute value with different signs. It is understood that in some embodiments, the first ratio and the second ratio may not have exactly the same absolute value. The different between the absolute values of the first ratio and the second ratio may be within a suitable predetermined small range, which may be determined based on specific applications.

Figure 4:
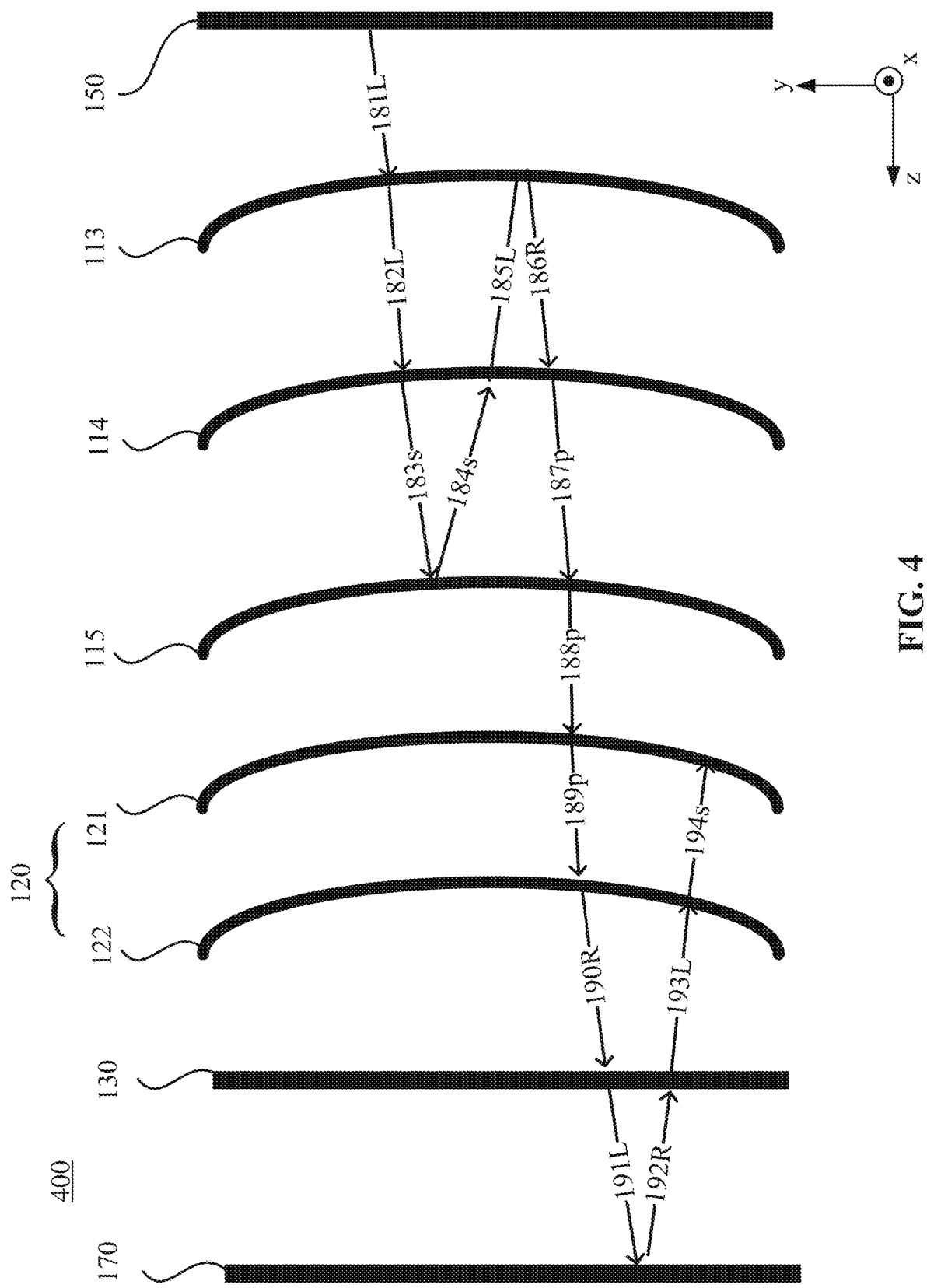
FIG. 4 schematically illustrates a light propagation path in the optical system shown in FIG. 3, according to an embodiment of the present disclosure.

FIG. 4 illustrates a schematic of a light propagation path 400 in the optical system 300 shown in FIG. 3 according to an embodiment of the disclosure. In the light propagation path 400, the change of polarization of the light is shown. Thus, the first optical element 111 and the second optical element 112, which are presumed to be lenses that do not affect the polarization of the light, are omitted for the simplicity of illustration. In FIG. 4, "s" denotes an s-polarized light, "p" denotes a p-polarized light, "R" denotes a right-handed circularly polarized ("RHCP") light, and "L" denotes a left-handed circularly polarized ("LHCP") light. In one embodiment, as shown in FIG. 4, a light 181 emitted from the electronic display 150 may be an LHCP light 181L. The light 181L may propagate toward the mirror 113. After the LHCP light (181L) reaches the mirror 113, a first portion of the light 181L may be reflected by the mirror 113, and a second portion of the light 181L may be transmitted by the mirror 133 as a light 182L propagating toward the waveplate 114. The light 182L transmitted through the mirror 113 may be an LHCP light. The waveplate 114 may be a quarter-wave plate configured to convert the LHCP light 182L to an s-polarized light 183s.

The s-polarized light 183s may be incident on the reflective polarizer 115, which may be configured to reflect a light polarized in a blocking direction (e.g., the x-axis direction), and transmit a light polarized in a perpendicular direction (e.g., the y-axis direction). That is, the reflective polarizer 115 may transmit a p-polarized light and reflect an s-polarized light. Thus, the s-polarized light 183s traveling in the positive z-direction from the waveplate 114 may be reflected by the reflective polarizer 115 as an s-polarized light 184s traveling in the negative z-direction. The reflected s-polarized light 184s may be transmitted through the waveplate 114 for a second time and converted to an LHCP light 185L traveling in the negative z-direction. The LHCP light 185L traveling in the negative z-direction may be reflect by the mirror 113 as an RHCP light 186R. The RHCP light 186R may be transmitted through the waveplate 114 and converted to be a p-polarized light 187p, which may be transmitted through the reflective polarizer 115 as a p-polarized light 188p incident onto the anti-narcissus film 120.

The anti-narcissus film 120 may include a linear polarizer 121 and a quarter-wave plate 122 arranged in an optical series. The linear polarizer 121 may be arranged between the reflective polarizer 115 and the quarter-wave plate 122. The quarter-wave plate 122 may be arranged between the linear polarizer 121 and the PBP lens 130. In one embodiment, the linear polarizer 121 may transmit a p-polarized light and block an s-polarized light. Thus, the p-polarized light 188p may be transmitted through the linear polarizer 121 as a p-polarized light 189p propagating toward the quarter-wave plate 122. The quarter-wave plate 122 may convert the p-polarized light 189p to an RHCP light 190R. As discussed above, when in the focusing or defocusing state, the PBP lens 130 may reverse the handedness of a circularly polarized light passing through the PBP lens 130 in addition to focusing or defocusing the incident light. Thus, the PBP lens 130 may convert the RHCP light 190R to an LHCP light 191L that is subsequently focused onto the eye 170.

The LHCP light 191L may be reflected by the eye 170 as an RHCP light 192R traveling in the negative z-direction. The PBP lens 130 may convert the RHCP light 192R to an LHCP light 193L, which may be converted to an s-polarized light 194s by the quarter-wave plate 122. Because the linear polarizer 121 transmits a p-polarized light and blocks an s-polarized light, the s-polarized light 194s may be blocked by the linear polarizer 121. Thus, the narcissus phenomenon may be suppressed, and the images of the eye 170 may be invisible to the user.

For illustrative purposes, FIG. 4 shows that the light 181 emitted from the electronic display 150 may be an LHCP light (L). In some embodiments, the light 181 emitted from the electronic display 150 may be an RHCP light (R). In some embodiments, the light 181 emitted from the electronic display 150 may be a linearly polarized light, and a quarter-wave plate may be arranged between the electronic display 150 and the mirror 113, or disposed at a surface of the mirror, to convert the linearly polarized light to a circularly polarized light.

Figure 5A:
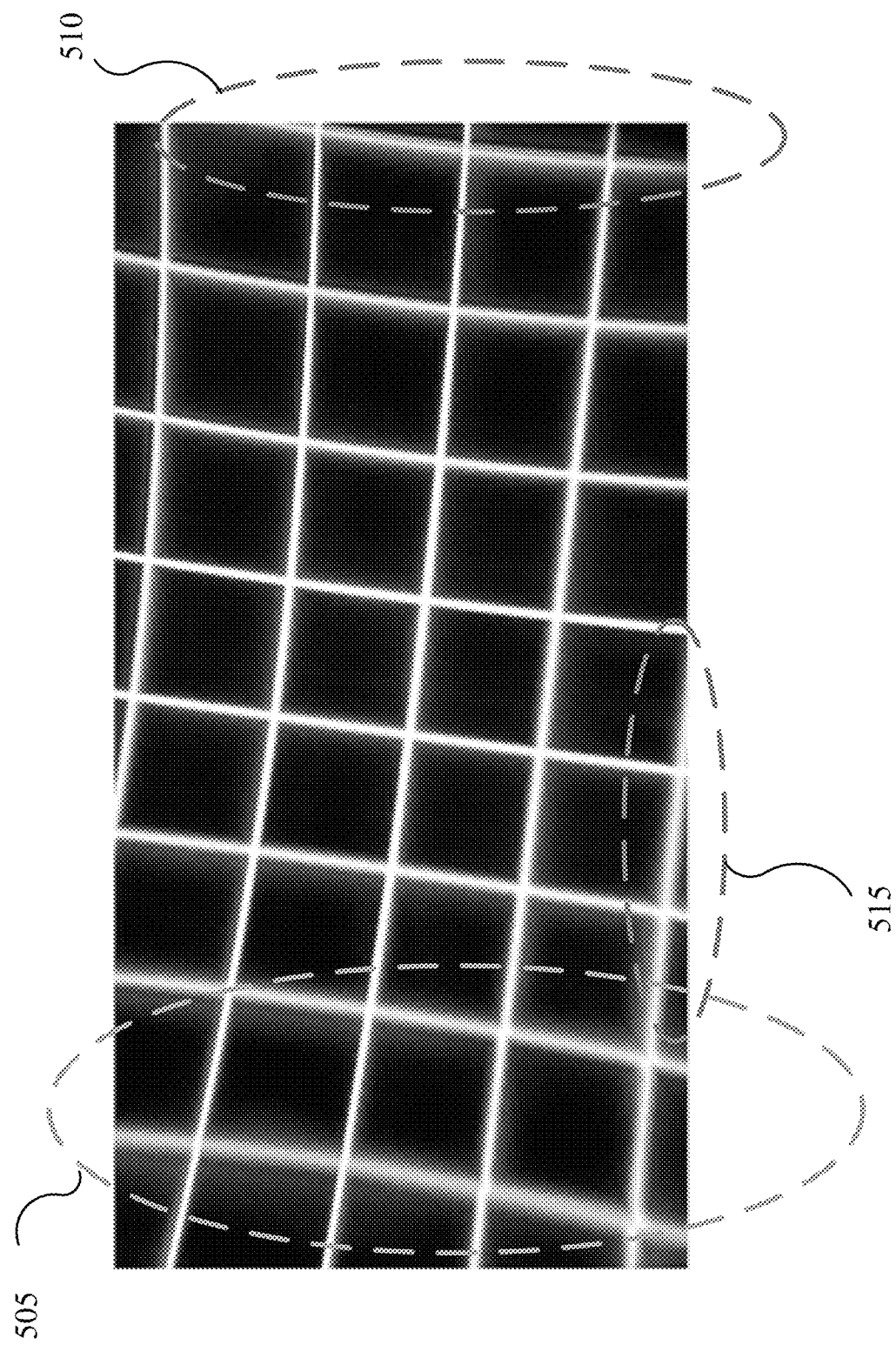
FIG. 5A schematically illustrates an image generated by a conventional pancake lens assembly without PBP lens.
Figure 5B:
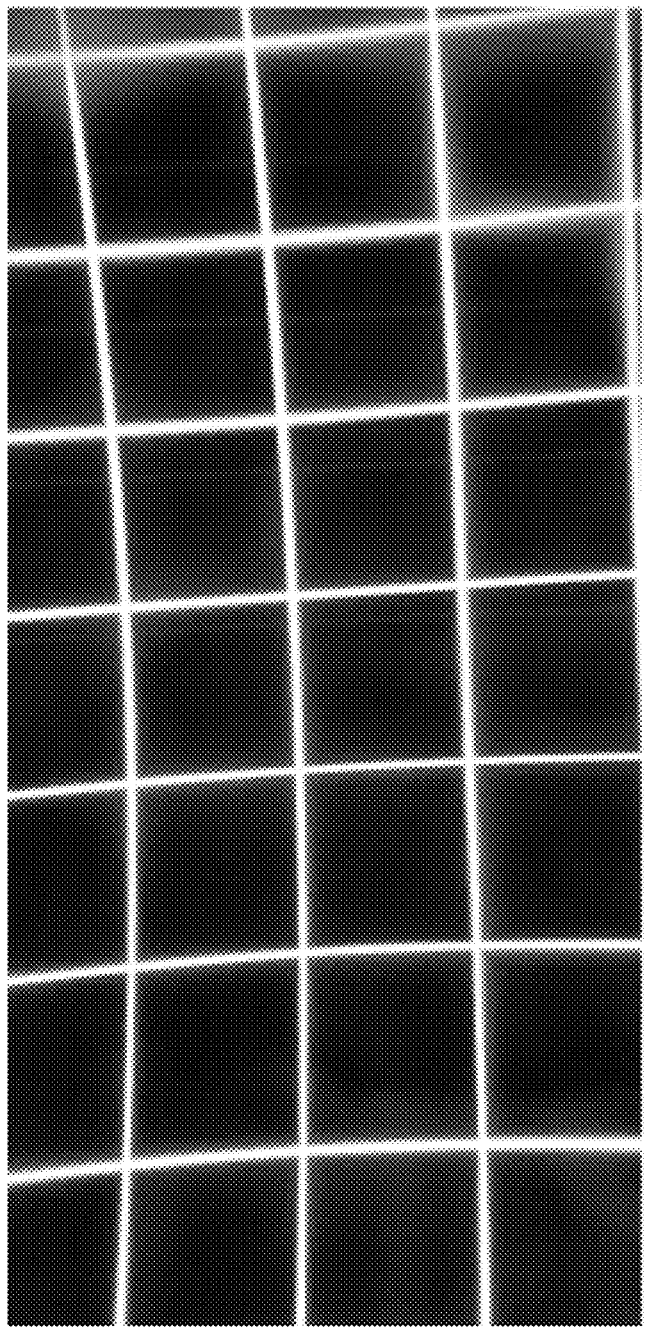
FIG. 5B schematically illustrates an image generated by a pancake lens assembly with a PBP lens, according to an embodiment of the present disclosure.

FIG. 5A is an image formed by a conventional pancake lens assembly including a lens that is not a PBP lens. As shown in FIG. 5A, as the conventional lens cannot focus all (or substantially all) of the colors to the same point, the image formed by the conventional pancake lens assembly has a substantial amount of chromatic aberration toward the edges of the image, as indicated by the dashed ellipses 505, 510, and 515. FIG. 5B is an image formed by the disclosed pancake lens assembly 105 that includes the pancake lens 110 and the PBP lens 130. The optical power of the PBP lens 130 is approximately 1.8 Diopter, which is determined according to the equation (3). As shown in FIG. 5B, because the dispersion of the pancake lens 110 is compensated by the dispersion of the PBP lens 130, the image formed by the disclosed pancake lens assembly 105 may have significantly reduced or suppressed chromatic aberration.

Figure 6A:
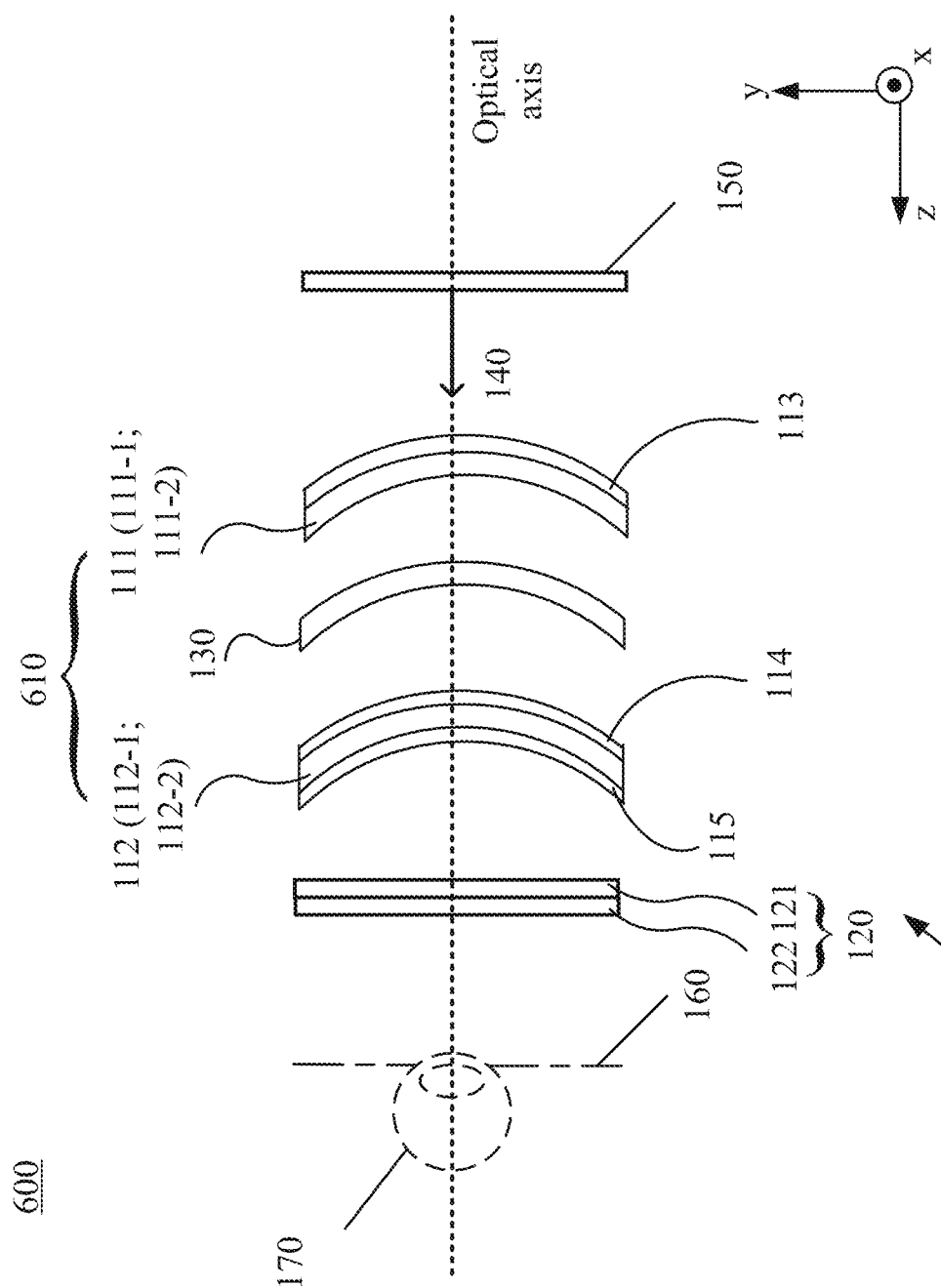
FIG. 6A illustrates a schematic diagram of an optical system, according to another embodiment of the present disclosure.

In some embodiments, the PBP lens may be disposed at other locations in the pancake lens assembly. FIG. 6A illustrates a schematic diagram of an optical system 600 according to an embodiment of the disclosure. The optical system 600 may include elements that are similar to or the same as those included in the optical system 100 or 300. The same reference numbers as those used in the optical system 300 are used to refer to the same or similar optical elements. Descriptions of the similar or same elements shown in FIG. 6A can refer to the above descriptions rendered in connection with FIG. 3.

As shown in FIG. 6A, the optical system 600 may include a pancake lens assembly 605. The pancake lens assembly 605 may include a pancake lens 610, the PBP lens 130, and the anti-narcissus film 120. The pancake lens 610 may include the first optical element 111 and the second optical element 112 arranged in an optical series. In some embodiments, the anti-narcissus film 120 may also be a part of the pancake lens 610. The PBP lens 130 may be disposed between the first optical element 111 and the second optical element 112. Although the PBP lens 130 is shown to be disposed apart from the first optical element 111 and the second optical element 112, in some embodiments, the PBP lens 130 may be integrally disposed with the first optical element 111, or the second optical element 112, or both. Although the PBP lens 130 is shown to have curved surfaces, in some embodiments, the PBP lens 130 may have one or both flat surfaces. Likewise, although the anti-narcissus film 120 is shown as disposed apart from the second optical element 112, in some embodiments, the anti-narcissus film 120 may be disposed at the second surface 112-2 of the second optical element 112. In some embodiments, the anti-narcissus film 120, the second optical element 112, the PBP lens 130, and the first optical element 111 may be stacked together (rather than being disposed separate from one another) to form a single integral piece. Although the first optical element 111, the PBP lens 130, and the second optical element 112 are shown to have curved surfaces, in some embodiments, one or both of the surfaces (111-1 and 111-2) of the first optical element 111 may have a flat surface, one or both of the surfaces (112-1 and 112-2) of the second optical element 112 may have a flat surface, and/or one or both of the surfaces of the PBP lens 130 may have a flat surface. The sequence and location of the elements 111, 112, 120, and 130 in the optical series are for illustrative purposes. The elements 111, 112, 120, and 130 may be arranged in other sequences or locations different from those shown in FIG. 6A.

The mirror 113 may be disposed (e.g., deposited, attached, bonded, coated, etc.) at the first surface 111-1 of the first optical element 111. The waveplate 114 (e.g., quarter-wave plate) may be disposed (e.g., deposited, attached, bonded, coated, etc.) at the first surface 112-1 of the second optical element 112. The reflective polarizer 115 may be disposed (e.g., deposited, attached, bonded, coated, etc.) at the second surface 112-2 of the second optical element 112. The anti-narcissus film 120 may be disposed between the second optical element 112 and the eye 170. The PBP lens 130 may be disposed between the first optical element 111 and the waveplate 114.

Figure 6B:
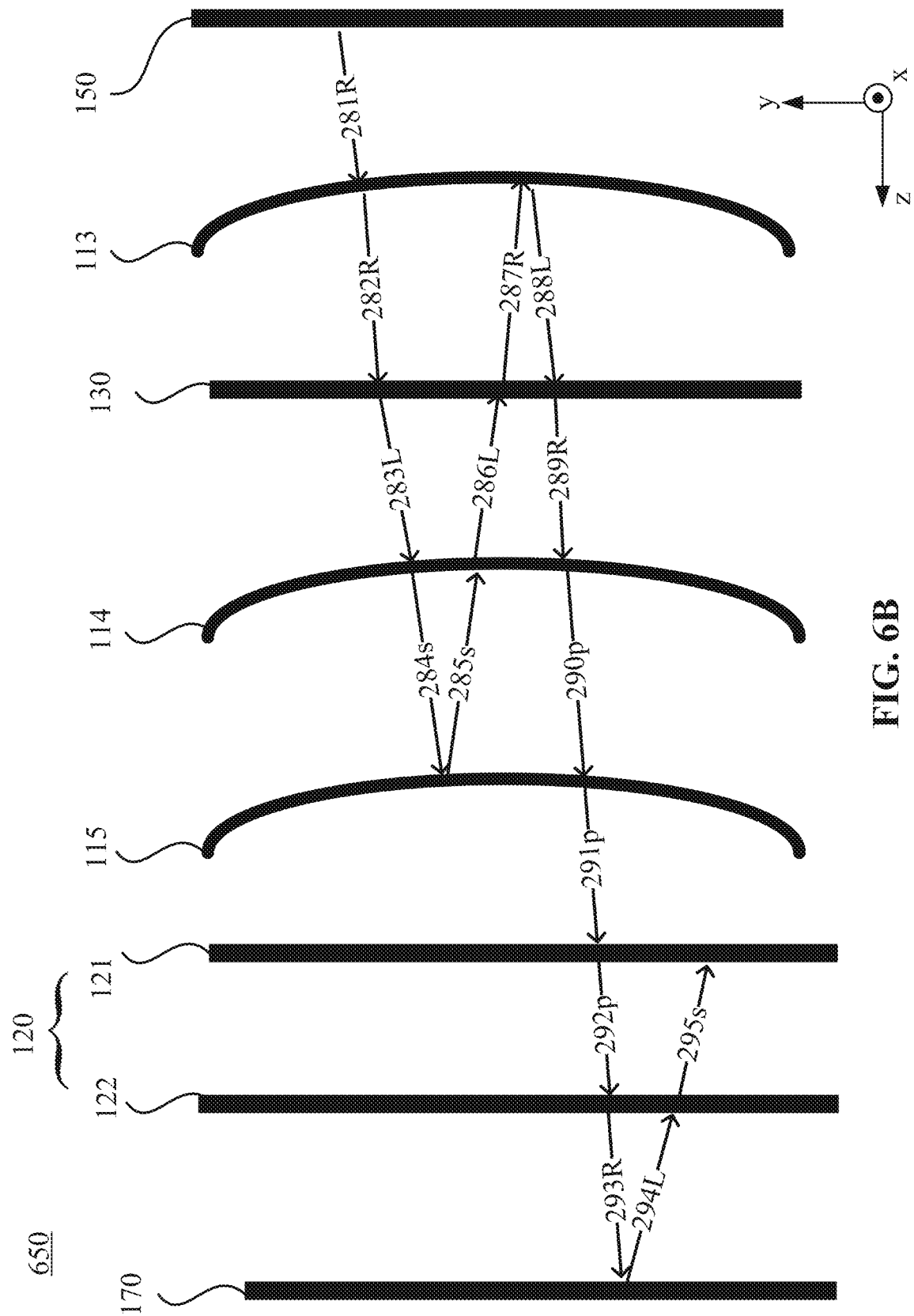
FIG. 6B schematically illustrates a light propagation path in the optical system shown in FIG. 6A, according to another embodiment of the present disclosure.

FIG. 6B schematically illustrates a light propagation path 650 in the optical system 600 shown in FIG. 6A. In the light propagation path 650, the change of polarization of the light is shown. Thus, the first optical element 111 and the second optical element 112, which are presumed to be lenses that do not affect the polarization of the light, are omitted for the simplicity of illustration. As shown in FIG. 6B, a light 281 emitted from the electronic display 150 may be an RHCP light 281R. The RHCP light 281R may propagate toward the mirror 113. After the RHCP light 281R reaches the mirror 113, a first portion of the light 281R may be reflected by the mirror 113, and a second portion of the light 281R may be transmitted by the mirror 113 as an RHCP light 282R propagating toward the PBP lens 130. The PBP lens 130 may convert the RHCP light 282R to an LHCP light 283L propagating toward the waveplate 114. The waveplate 114 may be a quarter-wave plate that converts the LHCP light 283L to an s-polarized light 284s.

The s-polarized light 284s may be incident on the reflective polarizer 115, which may be configured to transmit a p-polarized light and reflect an s-polarized light. Thus, the s-polarized light 284s may be reflected by the reflective polarizer 115 as an s-polarized light 285s traveling in the negative z-direction. The reflected s-polarized light 285s may be transmitted through the waveplate 114 for a second time and converted to an LHCP light 286L traveling in the negative z-direction towards the PBP lens 130. The PBP lens 130 may convert the LHCP light 286L to an RHCP light 287R, which may be reflect by the mirror 113 as an LHCP light 288L propagating toward the PBP lens 130. The PBP lens 130 may convert the LHCP light 288L to an RHCP light 289R. The waveplate 114 may transmit the RHCP light 289R as a p-polarized light 290p. The p-polarized light 290p may be transmitted by the reflective polarizer 115 as a p-polarized light 291p that is incident onto the anti-narcissus film 120.

The anti-narcissus film 120 may include the linear polarizer 121 and the quarter-wave plate 122 arranged between the linear polarizer 121 and the eye 170. The linear polarizer 121 may be disposed between the reflective polarizer 115 and the quarter-wave plate 122. The linear polarizer 121 may be configured to transmit a p-polarized light and block an s-polarized light. Thus, the p-polarized light 291p may be transmitted through the linear polarizer 121 as a p-polarized light 292p propagating toward the quarter-wave plate 122. The quarter-wave plate 122 may convert the p-polarized light 292p to an RHCP light 293R that is focused to the eye 170.

The RHCP light 293R may be reflect by the eye 170 as an LHCP light 294L traveling in the negative z-direction. The quarter-wave plate 122 may transmit the LHCP light 294L as an s-polarized light 295s. Because the linear polarizer 121 is configured to transmit a p-polarized light and blocks an s-polarized light, the s-polarized light 295s may be blocked by the linear polarizer 121. Thus, the narcissus phenomenon may be suppressed, and the images of the eye 170 may not be visible to the user.

Figure 7:
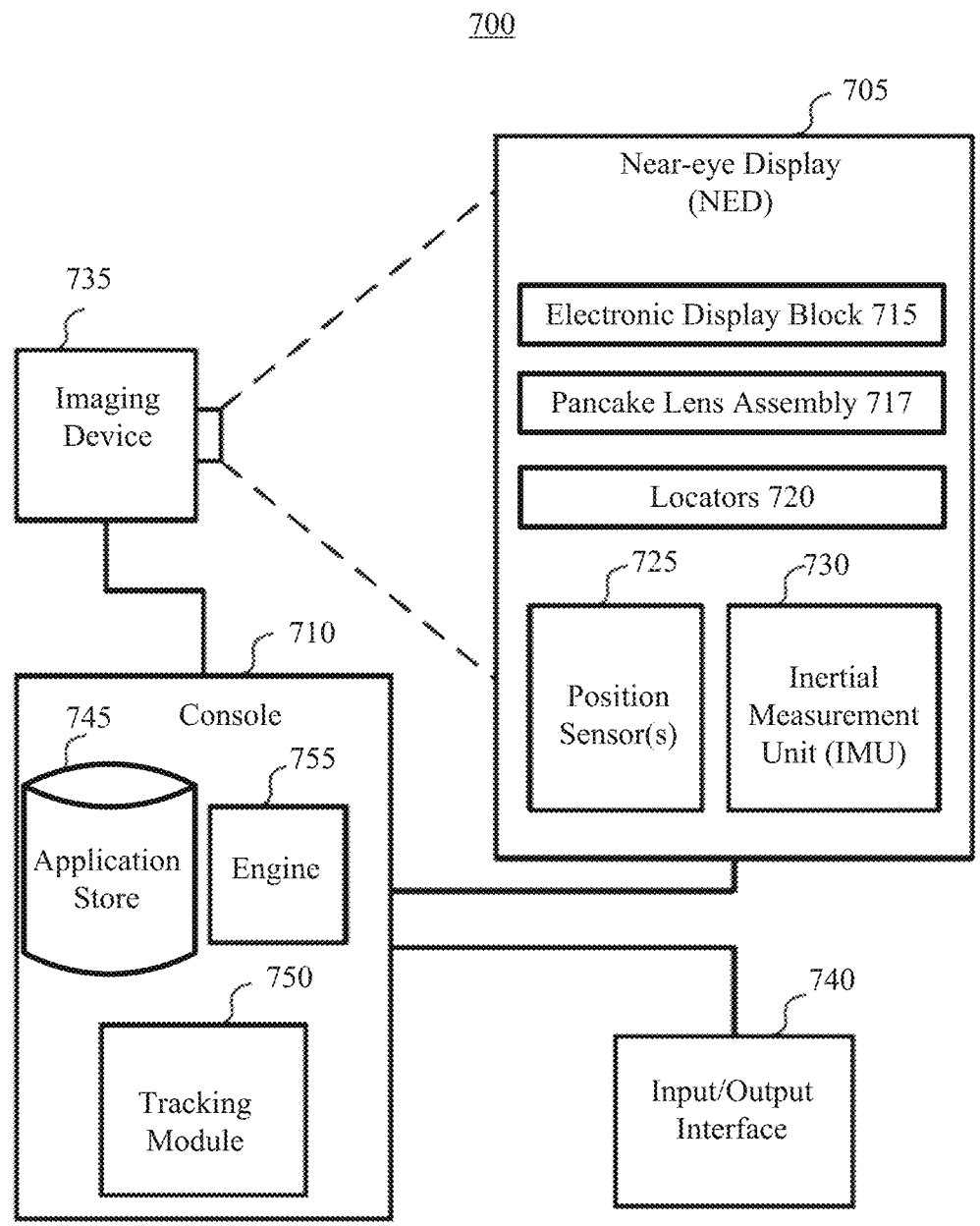
FIG. 7 illustrates a schematic block diagram of a system, according to an embodiment of the present disclosure.

FIG. 7 shows a block diagram of a system 700 according to an embodiment of the disclosure. As shown in FIG. 7, the system 700 may include a near-eye display ("NED") 705, a console 710, an imaging device 735, and an input/output interface 740. The NED 705, the imaging device 735, and the input/output interface 740 may be coupled to the console 710. Although FIG. 7 shows an example system 700 including one NED 705, one imaging device 735, and one input/output interface 740, in some other embodiments, any number of these components may be included in the system 700. For example, the system 700 may include multiple NEDs 705 each having an associated input/output interface 740 and one or more imaging devices 735. Each of the NED 705, input/output interface 740, and imaging device 735 may communicate with the console 710. In some embodiments, different and/or additional components may be included in the system 700. The system 700 may operate in a VR system environment, an AR system environment, an MR system environment, or some combination thereof.

The NED 705 may be a head-mounted display that presents media content to a user. Examples of the media content presented by the NED may include one or more images, video, audio, or some combination thereof. In some embodiments, audio may be presented via an external device (e.g., a speaker and/or a headphone) which receives audio information from the NED 705, the console 710, or both, and presents audio data to the user based on the audio information. An example of the NED 705 is further described below in connection with FIGS. 8A and 8B.

The NED 705 may include one or more bodies, which may be rigidly or non-rigidly coupled to each other. A rigid coupling between rigid bodies may cause the coupled rigid bodies to move as a single rigid entity. In contrast, a non-rigid coupling between rigid bodies may allow the rigid bodies to move relative to each other. In some embodiments, the NED 705 may present VR content, AR content, MR content, or some combination thereof to the user. In the VR, AR, and/or MR applications, the NED 705 may augment views of a physical, real-world environment with computer-generated elements (e.g., images, video, sound, etc.).

As shown in FIG. 7, the NED 705 may include an electronic display block 715, a pancake lens assembly 717, one or more locators 720, one or more position sensors 725, and an inertial measurement unit ("IMU") 730. The electronic display block 715 may display images to the user in accordance with data received from the console 710. In some embodiments, the electronic display block 715 may include an electronic display and an optics block. The electronic display may generate an image light. In some embodiments, the electronic display may include a single electronic display or multiple electronic displays (e.g., a display for each eye of a user). Examples of the electronic display may include: a liquid crystal display ("LCD"), an organic light emitting diode ("OLED") display, an active-matrix organic light-emitting diode display ("AMOLED"), a transparent organic light emitting diode display ("TOLED"), some other display, a projector, or a combination thereof.

The optics block may include a combination of different optical elements. An optical element may be an aperture, a Fresnel lens, a convex lens, a concave lens, a filter, or any other suitable optical element that may be configured to affect the image light emitted from the electronic display. In some embodiments, one or more of the optical elements included in the optics block may include one or more coatings, such as anti-reflective coatings. Magnification of the image light by the optics block may allow elements of the electronic display to be physically smaller, weigh less, and consume less power than larger displays. Additionally, magnification may increase a field of view of the displayed media content. For example, the field of view of the displayed media content may be widened, such that the displayed media content may be presented using a significant portion of the field of view of the user (e.g., 150 degrees diagonal). In some embodiments, the optics block may be configured to have an effective focal length larger than the spacing to the electronic display, thereby magnifying the image light projected by the electronic display. Additionally, in some embodiments, the amount of magnification may be adjusted by adding or removing optical elements.

The pancake lens assembly 717 may be an embodiment of the disclosed pancake lens assembly that is achromatic due to the compensation of the PBP lens. In some embodiments, the pancake lens assembly 717 may be configured as a monolithic pancake lens assembly without any air gaps between optical elements of the pancake lens assembly. The pancake lens assembly 717 may be configured to magnify an image light received from the electronic display, correct optical aberrations associated with the image light. The image light with the optical aberrations corrected may be presented to the user of the NED 705.

The locators 720 may be objects located at various positions on or in the NED 705 relative to one another and relative to a specific reference point on or in the NED 705. A locator 720 may be a light emitting diode ("LED"), a corner cube reflector, a reflective marker, a type of light source that contrasts with an environment in which the NED 705 operates, or a combination thereof. In some embodiments, the locators 720 may be active elements (e.g., LED or other type of light-emitting devices). The locators 720 may emit lights in the visible band (e.g., from about 380 nm to about 750 nm), in the infrared ("IR") band (e.g., about 750 nm to about 1 mm), in the ultraviolet band (e.g., about 10 nm to about 380 nm), another portion of the electromagnetic spectrum, or a combination thereof.

In some embodiments, the locators 720 may be located beneath an outer surface of the NED 705, which may be transparent to the wavelengths of lights emitted or reflected by the locators 720. In some embodiments, the locators the NED 705 may be sufficiently thin to not substantially attenuate the wavelengths of lights emitted or reflected by the locators 720. In some embodiments, the outer surface or other portions of the NED 705 may be opaque in the visible band. Thus, the locators 720 may emit lights in the IR band under an outer surface that may be transparent in the IR band but opaque in the visible band.

The IMU 730 may be an electronic device configured to generate fast calibration data based on measurement signals received from one or more of the position sensors 725. A position sensor 725 may be configured to generate one or more measurement signals in response to the motion of the NED 705. Examples of position sensors 725 may include: one or more accelerometers, one or more gyroscopes, one or more magnetometers, another suitable type of sensor that detects motion, a sensor configured for error correction of the IMU 730, or one or more combinations thereof. The position sensors 725 may be located external to the IMU 730, internal to the IMU 730, or a combination thereof.

Based on the one or more measurement signals from one or more position sensors 725, the IMU 730 may generate fast calibration data indicating an estimated position of the NED 705 relative to an initial position of the NED 705. For example, the position sensors 725 may include multiple accelerometers to measure translational motion (forward/back, up/down, left/right) and multiple gyroscopes to measure rotational motion (e.g., pitch, yaw, roll). In some embodiments, the IMU 730 may rapidly samples the measurement signals and calculate the estimated position of the NED 705 from the sampled data. For example, the IMU 730 may integrate the measurement signals received from the accelerometers over time to estimate a velocity vector and integrate the velocity vector over time to determine an estimated position of a reference point on the NED 705. In some embodiments, the IMU 730 may provide the sampled measurement signals to the console 710, which may determine the fast calibration data. The reference point may be a point that may be used to describe the position of the NED 705. While the reference point may generally be defined as a point in space, in some embodiments, the reference point may be defined as a point within the NED 705 (e.g., a center of the IMU 730).

The IMU 730 may receive one or more calibration parameters from the console 710. As further discussed below, the one or more calibration parameters may be used to maintain tracking of the NED 705. Based on a received calibration parameter, the IMU 730 may adjust one or more IMU parameters (e.g., a sampling rate). In some embodiments, certain calibration parameters may cause the IMU 730 to update an initial position of the reference point, such that the initial position corresponds to a next calibrated position of the reference point. Updating the initial position of the reference point as the next calibrated position of the reference point may help reduce accumulated errors associated with the determined estimated position. The accumulated errors, also referred to as drift errors, may cause the estimated position of the reference point to "drift" away from the actual position of the reference point over time.

The imaging device 735 may generate slow calibration data in accordance with calibration parameters received from the console 710. Slow calibration data may include one or more images showing observed positions of the locators 720 that may be detectable by the imaging device 735. The imaging device 735 may include one or more photo cameras, one or more video cameras, any other device capable of capturing images including one or more of the locators 720, or some combination thereof. Additionally, the imaging device 735 may include one or more filters (e.g., for increasing signal to noise ratio). The imaging device 735 may be configured to detect lights emitted or reflected from locators 720 in a field of view of the imaging device 735.

In some embodiments, when the locators 720 include passive elements (e.g., a retroreflector), the imaging device 735 may include a light source that illuminates some or all of the locators 720, which retro-reflect the light toward the light source in the imaging device 735. Slow calibration data may be communicated from the imaging device 735 to the console 710. The imaging device 73 may receive one or more calibration parameters from the console 710 to adjust one or more imaging parameters (e.g., focal length, focus, frame rate, ISO, sensor temperature, shutter speed, aperture, etc.).

The input interface 740 may be a device configured to receive an input from a user, such as an action request to the console 710, or to output data received from the console 710. An action request may be a request to perform a particular action. For example, an action request may be starting or ending an application or performing a particular action within the application. The input/output interface 740 may include one or more input devices and/or output devices. Example input devices may include: a keyboard, a mouse, a game controller, or any other suitable device for receiving action requests and communicating the received action requests to the console 710. The output devices may include a data transfer port, a display, an video/audio player, etc. An action request received by the input/output interface 740 may be communicated to the console 710, which may perform an action corresponding to the action request. In some embodiments, the input/output interface 740 may provide a haptic feedback to the user in accordance with instructions received from the console 710. For example, the haptic feedback may be provided when an action request is received, or the console 710 may communicate instructions to the input/output interface 740 causing the input/output interface 740 to generate the haptic feedback when the console 710 performs an action.

The console 710 may provide media content to the NED 705 for presenting to the user in accordance with information received from one or more of: the imaging device 735, the NED 705, and the input/output interface 740. In some embodiments, as shown in FIG. 7, the console 710 may include an application store 745, a tracking module 750, and a virtual reality ("VR") engine 755. In some embodiments, the console 710 may include modules different from those shown in FIG. 7. The functions further described below may be distributed among components of the console 710 in a manner different from the manner described herein.

The application store 745 may store one or more applications for execution by the console 710. An application may be a group of instructions, that when executed by a processor, may generate content for presenting to the user. Content may be generated by an application in response to inputs received from the user via movement of the NED 705 or the input/output interface 740. Examples of applications may include gaming applications, conferencing applications, video playback application, or other suitable applications.

The tracking module 750 may calibrate the system 700 using one or more calibration parameters and may adjust one or more calibration parameters to reduce errors in determination of the position of the NED 705. For example, the tracking module 750 may adjust the focus of the imaging device 735 to obtain a more accurate position for observed locators on the NED 705. Moreover, calibration performed by the tracking module 750 may also account for information received from the IMU 730. Additionally, when tracking of the NED 705 is lost (e.g., when the imaging device 735 loses line of sight of at least a threshold number of the locators 720), the tracking module 750 may re-calibrate portions or the entire system 700.

The tracking module 750 may track movements of the NED 705 using slow calibration data or information from the imaging device 735. The tracking module 750 may determine positions of a reference point of the NED 705 using observed locators from the slow calibration information and a model of the NED 705. The tracking module 750 may also determine positions of a reference point of the NED 705 using position information from the fast calibration information. Additionally, in some embodiments, the tracking module 750 may use portions of the fast calibration information, the slow calibration information, or some combination thereof, to predict a future location of the NED 705. The tracking module 750 may provide the estimated or predicted future position of the NED 705 to the engine 755.

The engine 755 may execute applications within the system 700 and receive position information, acceleration information, velocity information, predicted future positions, or some combination thereof of the NED 705 from the tracking module 750. Based on the received information, the engine 755 may determine content to provide to the NED 705 for presenting to the user. For example, when the received information indicates that the user has looked to the left, the engine 755 may generate content for the NED 705 that mirrors the user's movement in a virtual environment. Additionally, the engine 755 may perform an action within an application executing on the console 710 in response to an action request received from the input/output interface 740, and provide feedback to the user that the action was performed. The provided feedback may be visual or audible feedback via the NED 705 or haptic feedback via the input/output interface 740.

Figure 8A:
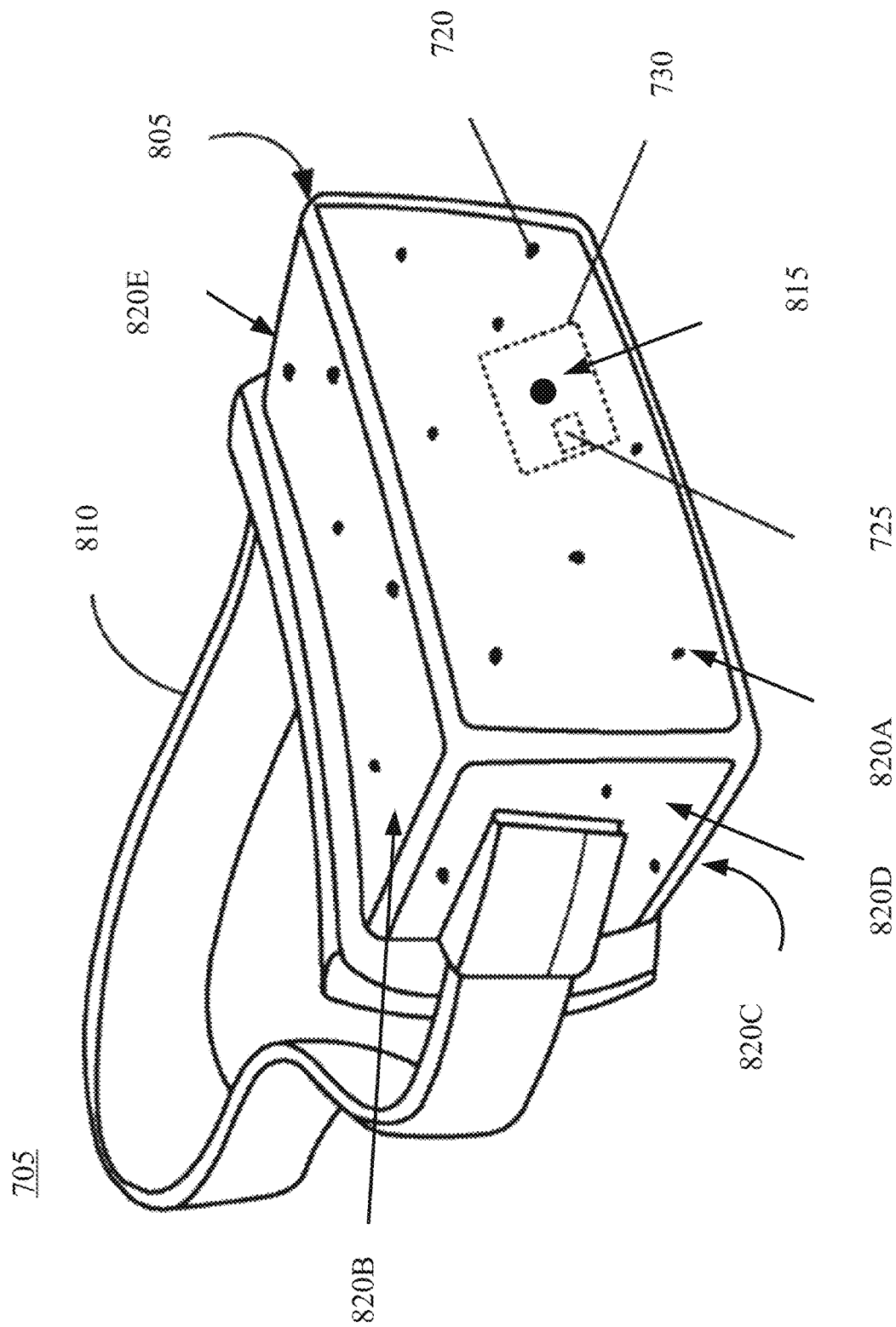
FIG. 8A illustrates a schematic diagram of a near-eye display ("NED") shown in FIG. 7, according to an embodiment of the present disclosure.

FIG. 8A illustrates a diagram of the NED 705 in FIG. 7. Referring to FIG. 8A and FIG. 7, the NED 705 may include a front body 805 and a band 810. The front body 805 may include one or more electronic display elements of the electronic display and optics block (not shown in FIG. 8A), the IMU 730, the one or more position sensors 725, and the locators 720. In the example shown in FIG. 8A, the position sensors 725 may be located within the IMU 730, and neither the IMU 730 nor the position sensors 725 may be visible to the user.

The locators 720 may be located at fixed positions on the front body 805 relative to one another and relative to a reference point 815. In the embodiment shown in FIG. 8A, the reference point 815 may be located at the center of the IMU 730. Each of the locators 720 may emit lights that may be detectable by the imaging device 735. The locators 720, or some of the locators 720, may be located on a front side 820A, a top side 820B, a bottom side 820C, a right side 820D, and a left side 820E of the front body 805.

Figure 8B:
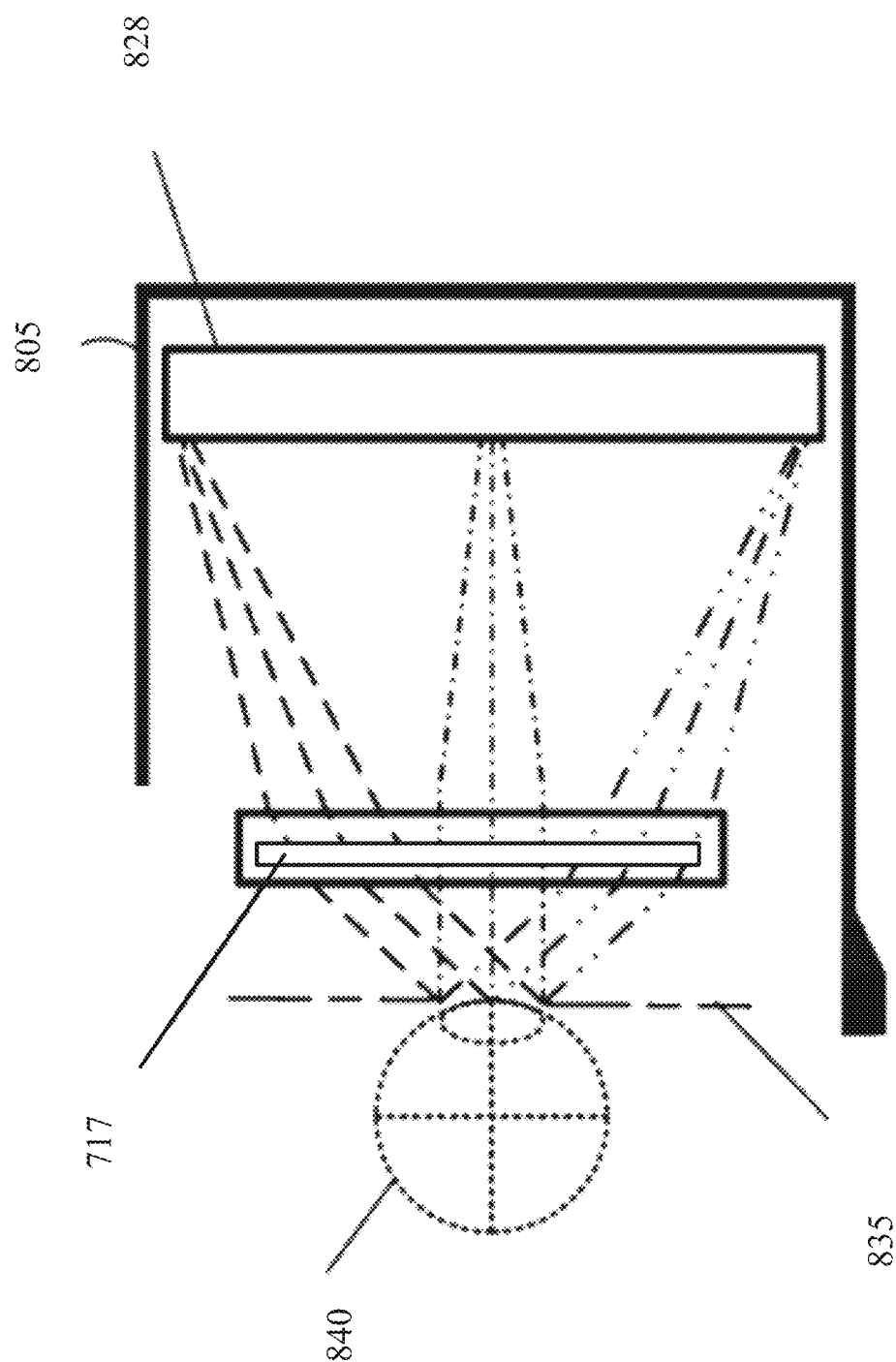
FIG. 8B illustrates a schematic cross-sectional view of a front body of the NED shown in FIG. 8A, according to an embodiment of the present disclosure.

FIG. 8B is a cross-sectional view of the front body 805 of the NED 705 shown in FIG. 8A. As shown in FIG. 8B, the front body 805 may include the electronic display 828 and the pancake lens assembly 717 that provides an altered image light to an exit pupil 835. The exit pupil 835 may be at a location of the front body 805 where an eye 840 may be positioned. For illustrative purposes, FIG. 8B shows a cross-section of the front body 805 associated with a single eye 840. In some embodiments, another similar electronic display, separate from the electronic display 828, may provide image light altered by the optics block to another eye of the user.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

The term "unit," "sub-unit," or "module" may encompass a hardware component, a software component, or a combination thereof. For example, a "unit," "sub-unit," or "module" may include a housing, a device, a sensor, a processor, an algorithm, a circuit, an electrical or mechanical connector, etc.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment. Such combinations of different features shown in different drawings are also within the scope of the present disclosure.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical lens assembly, comprising:
   an optical lens; and
   a Pancharatnam Berry Phase ("PBP") element coupled to the optical lens, and configured to provide chromatic aberration correction for the optical lens,
   wherein an Abbe number of the PBP element and an Abbe number of the optical lens have opposite signs, and
   wherein the optical lens includes:
      a first optical element;
      a second optical element coupled with the first optical element;
      a mirror disposed at a surface of the first optical element;
      a reflective polarizer disposed at a surface of the second optical element; and
      a waveplate disposed between the mirror and the reflective polarizer.

2. The optical lens assembly of claim 1, wherein the Abbe number of the PBP element is negative, and the Abbe number of the optical lens is positive.

3. The optical lens assembly of claim 1, wherein
   the optical lens is associated with a first ratio between a difference between an optical power of the optical lens and an optical power of the mirror and the Abbe number of the optical lens,
   the PBP element is associated with a second ratio between an optical power of the PBP element and the Abbe number of the PBP element, and
   a sum of the first ratio and the second ratio is substantially zero at a design wavelength.

4. The optical lens assembly of claim 1, wherein:
   the surface of the first optical element at which the mirror is disposed is a first surface of the first optical element, and
   the waveplate is disposed at the first surface or at a second surface of the first optical element.

5. The optical lens assembly of claim 1, wherein:
   the surface of the second optical element at which the reflective polarizer is disposed is a first surface of the second optical element, and
   the waveplate is disposed a second surface of the second optical element.

6. The optical lens assembly of claim 1, wherein the PBP element is a PBP lens.

7. The optical lens assembly of claim 1, wherein the optical lens is a monolithic curved optical element.

8. The optical lens assembly of claim 1, wherein
   the second optical element is disposed between the PBP element and the first optical element.

9. The optical lens assembly of claim 1, wherein
   the PBP element is disposed between the second optical element and the first optical element.

10. The optical lens assembly of claim 9, wherein the waveplate is a first waveplate, and the optical lens assembly further comprises:
    an anti-narcissus film including a linear polarizer and a second waveplate coupled to the linear polarizer,
    wherein the second optical element is disposed between the anti-narcissus film and the PBP element.

11. An optical lens assembly, comprising:
    an optical lens; and
    a Pancharatnam Berry Phase ("PBP") element coupled to the optical lens, and configured to provide chromatic aberration correction for the optical lens,
    wherein an Abbe number of the PBP element and an Abbe number of the optical lens have opposite signs,
    wherein the optical lens includes:
       a first optical element;
       a second optical element coupled to the first optical element;
       a linear polarizer disposed at a surface of the second optical element; and
       a quarter-wave plate optically coupled to the linear polarizer, and wherein the linear polarizer is disposed between the second optical element and the quarter-wave plate, and the quarter-wave plate is disposed between the linear polarizer and the PBP element.

12. The optical lens assembly of claim 8, wherein the quarter-wave plate is a first waveplate, and
wherein the optical lens includes:
a mirror disposed at a first surface of the first optical element and a second waveplate disposed at a second surface of the first optical element, and
a reflective polarizer,
wherein the linear polarizer is disposed between the reflective polarizer and the quarter-wave plate.

13. An optical system, comprising:
an electronic display configured to generate an image light; and
an optical lens assembly optically coupled with the electronic display and configured to guide the image light to an eye-box, the optical lens assembly including:
an optical lens; and
a Pancharatnam Berry Phase ("PBP") element coupled to the optical lens, and configured to provide chromatic aberration correction for the optical lens,
wherein an Abbe number of the PBP element and an Abbe number of the optical lens have opposite signs, and
wherein the optical lens includes:
a first optical element
a second optical element coupled with the first optical element
a mirror disposed at a surface of the first optical element
a reflective polarizer disposed at a surface of the second optical element and
a waveplate disposed between the mirror and the reflective polarizer.

14. The optical system of claim 13, wherein the Abbe number of the PBP element is negative, and the Abbe number of the optical lens is positive.

15. The optical system of claim 13, wherein:
the optical lens is associated with a first ratio between a difference between an optical power of the optical lens and an optical power of the mirror and the Abbe number of the optical lens,
the PBP element is associated with a second ratio between an optical power of the PBP element and the Abbe number of the PBP element, and
a sum of the first ratio and the second ratio is substantially zero at a design wavelength.

16. The optical system of claim 13, wherein the optical lens includes:
the surface of the first optical element at which the mirror is disposed is a first surface of the first optical element, and
the waveplate is disposed at the first surface or a second surface of the first optical element.

17. The optical system of claim 13, wherein:
the surface of the second optical element at which the reflective polarizer is disposed is a first surface of the second optical element, and
the waveplate is disposed a second surface of the second optical element.

18. The optical system of claim 13,
wherein the waveplate is a first waveplate, and the optical lens assembly further comprises an anti-narcissus film coupled with the second optical element, wherein the anti-narcissus film includes a linear polarizer and a second waveplate optically coupled to the linear polarizer, and
wherein the linear polarizer is disposed between the second optical element and the second waveplate.

19. The optical system of claim 13, wherein:
the second optical element is disposed between the PBP element and the first optical element.

20. The optical system of claim 13, wherein:
the PBP element is disposed between the second optical element and the first optical element.

* * * * *